(12) United States Patent
Tsuda

(10) Patent No.: US 12,309,658 B2
(45) Date of Patent: May 20, 2025

(54) CONTROL DEVICE, WIRELESS COMMUNICATION DEVICE, AND CONTROL METHOD

(71) Applicant: Sony Group Corporation, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 356 days.

(21) Appl. No.: 17/911,418

(22) PCT Filed: Mar. 17, 2021

(86) PCT No.: PCT/JP2021/010720
§ 371 (c)(1),
(2) Date: Sep. 14, 2022

(87) PCT Pub. No.: WO2021/193263
PCT Pub. Date: Sep. 30, 2021

(65) Prior Publication Data
US 2023/0156549 A1    May 18, 2023

(30) Foreign Application Priority Data
Mar. 26, 2020  (JP) .................................. 2020-055919

(51) Int. Cl.
*H04W 36/14* (2009.01)
*H04W 36/30* (2009.01)
(Continued)

(52) U.S. Cl.
CPC ........... *H04W 36/14* (2013.01); *H04W 36/30* (2013.01); *H04W 36/32* (2013.01); *H04W 36/38* (2013.01)

(58) Field of Classification Search
CPC ..... H04W 36/14; H04W 36/30; H04W 36/32; H04W 36/38
See application file for complete search history.

(56) References Cited

U.S. PATENT DOCUMENTS

| 9,883,515 B2 * | 1/2018 | Rysgaard | H04W 48/12 |
| 10,314,006 B2 * | 6/2019 | Wallentin | H04W 68/12 |

(Continued)

FOREIGN PATENT DOCUMENTS

| CN | 103797888 B | * | 5/2018 | ........... H04B 7/0413 |
| CN | 110945910 B | * | 12/2022 | ........... H04L 5/0051 |

(Continued)

OTHER PUBLICATIONS

International Search Report and Written Opinion mailed on Jun. 15, 2021, received for PCT Application PCT/JP2021/010720, filed on Mar. 17, 2021, 9 pages including English Translation.

*Primary Examiner* — Adam D Houston
(74) *Attorney, Agent, or Firm* — XSENSUS LLP

(57) ABSTRACT

A control device includes a control that acquires, from a first wireless communication device that performs data communication of a first application via a first PLMN, information related to first communication including position information of the first wireless communication device, information for identifying a process of the first application, and information for identifying the first PLMN, acquires, from a second wireless communication device that performs data communication of a second application via a second PLMN, information related to second communication including position information of the second wireless communication device, information for identifying a process of the second application, and information for identifying the second PLMN, and determines execution of switching processing of switching the PLMN of one of the wireless communication devices to the PLMN of the other of the wireless communication devices based on the information related to the first communication and the information related to the second communication.

18 Claims, 8 Drawing Sheets

(51) Int. Cl.
*H04W 36/32* (2009.01)
*H04W 36/38* (2009.01)

(56) References Cited

U.S. PATENT DOCUMENTS

| | | | |
|---|---|---|---|
| 11,044,783 B2 * | 6/2021 | Majumder | H04W 36/144 |
| 11,071,086 B2 * | 7/2021 | Park | H04W 76/28 |
| 11,076,379 B2 * | 7/2021 | Liu | H04B 7/0408 |
| 11,140,657 B2 * | 10/2021 | Mukherjee | H04W 68/02 |
| 11,172,463 B2 * | 11/2021 | Ozturk | H04W 68/02 |
| 11,483,797 B2 * | 10/2022 | Mukherjee | H04W 60/005 |
| 11,997,585 B2 * | 5/2024 | Raval | H04W 12/062 |
| 12,052,643 B2 * | 7/2024 | Vamanan | H04W 4/80 |
| 12,177,940 B2 * | 12/2024 | Kavuri | H04W 76/27 |
| 2012/0008595 A1 | 1/2012 | Wang | |
| 2013/0303203 A1 * | 11/2013 | Wang | H04W 68/00 455/458 |
| 2014/0370901 A1 * | 12/2014 | Jung | H04W 36/0085 455/437 |
| 2016/0296840 A1 | 10/2016 | Kaewell | |
| 2017/0245135 A1 | 8/2017 | Park | |
| 2019/0268819 A1 * | 8/2019 | Kim | H04W 72/12 |
| 2019/0313238 A1 | 10/2019 | Palanigounder | |
| 2021/0068028 A1 * | 3/2021 | Wei | H04W 36/322 |
| 2021/0168664 A1 * | 6/2021 | Otaka | H04W 36/0005 |
| 2023/0156549 A1 * | 5/2023 | Tsuda | H04W 36/30 455/440 |
| 2023/0337123 A1 * | 10/2023 | Tsuda | H04L 67/51 |

FOREIGN PATENT DOCUMENTS

| | | | | |
|---|---|---|---|---|
| EP | 2254356 A1 * | 11/2010 | | H04W 36/30 |
| JP | 2017523715 A * | 8/2017 | | |
| KR | 20220138836 A * | 10/2022 | | |
| WO | 2004/105272 A1 | 12/2004 | | |
| WO | 2009/110103 A1 | 9/2009 | | |
| WO | 2009/119056 A1 | 10/2009 | | |
| WO | WO-2019091639 A1 * | 5/2019 | | H04W 36/00 |
| WO | WO-2019230227 A1 * | 12/2019 | | H04W 48/18 |
| WO | WO-2020027639 A1 | 2/2020 | | |
| WO | WO-2021193263 A1 * | 9/2021 | | H04W 36/14 |
| WO | WO-2023042430 A1 * | 3/2023 | | |
| WO | WO-2024166332 A1 * | 8/2024 | | |

* cited by examiner

CONTROL DEVICE, WIRELESS COMMUNICATION DEVICE, AND CONTROL METHOD

CROSS-REFERENCE TO RELATED APPLICATIONS

The present application is based on PCT filing PCT/JP2021/010720, filed Mar. 17, 2021, which claims priority to Japanese Patent Application No. 2020-055919, filed Mar. 26, 2020, the entire contents of each are incorporated herein by reference.

FIELD

Embodiments of the present invention relate to a control device, a wireless communication device, and a control method.

BACKGROUND

A service using a fifth generation mobile communication system, so-called 5G, having characteristics of ultra-high speed, low delay, high reliability, and multiple simultaneous connection is about to start soon. Even in the 4G generation, wearable devices compatible with virtual reality (VR) have appeared mainly for use cases of games, but it has not been always easy to provide services via radio from the viewpoint of delay and throughput.

CITATION LIST

Non Patent Literature

Patent Literature 1: US 2013/0303203 A

SUMMARY

Technical Problem

As described above, the 5G has features of ultra-high speed, low delay, high reliability, and multiple simultaneous connection, and therefore transmission of high-quality moving images such as 4K and 8K is expected. Furthermore, wearable devices are also expected to spread as post-smartphones. Some use cases of wearable devices require consideration of not only the aspect of ultra-high speed but also the aspect of low delay and high reliability. For example, in a game in which a plurality of users simultaneously participate, even if users play in the same area or space (e.g., square, room), if the network configuration is different between the users, the communication quality (quality of experience (QoE) at end to end (E2E)) of each user may be different, and it is important to secure fairness between the users in order to establish the game. That is, when providing services to a plurality of users, it is important to minimize a difference in communication quality caused by a network configuration.

Therefore, an object of the present disclosure is to provide a control device, a wireless communication device, and a control method capable of suppressing a difference in communication quality caused by a network configuration when providing a service to a plurality of users.

Solution to Problem

A control device includes a control unit. The control unit acquires, from a first wireless communication device that performs data communication of a first application via a first PLMN, information related to first communication including position information of the first wireless communication device, information for identifying a process of the first application, and information for identifying the first PLMN, acquires, from a second wireless communication device that performs data communication of a second application via a second PLMN, information related to second communication including position information of the second wireless communication device, information for identifying a process of the second application, and information for identifying the second PLMN, and determines execution of switching processing of switching the PLMN of one of the wireless communication devices to the PLMN of the other of the wireless communication devices based on the information related to the first communication and the information related to the second communication.

DESCRIPTION OF EMBODIMENTS

Hereinafter, embodiments of the present disclosure will be described in detail with reference to the drawings. Note that, in each of the following embodiments, the same parts are denoted by the same reference signs, and redundant description will be omitted.

In addition, in the present specification and the drawings, a plurality of components having substantially the same functional configuration may be distinguished by attaching different characters after the same reference sign. For example, a plurality of configurations having substantially the same functional configuration is distinguished as wireless communication devices 100A and 100B as necessary. However, in a case where it is not particularly necessary to distinguish each of a plurality of components having substantially the same functional configuration, only the same reference sign is attached. For example, in a case where it is not necessary to particularly distinguish the wireless communication devices 100A and 100B, they are simply referred to as wireless communication devices 100.

In addition, the present disclosure will be described according to the following item order.
1. Introduction
2. First embodiment
   2-1. Overall configuration of communication system
   2-2. Configuration of wireless communication device
   2-3. Configuration of base station device
   2-4. Configuration of data processing device
   2-5. Configuration of control device
   2-6. Operation example of communication system
   2-7. PLMN switching processing
3. Second embodiment
4. Third embodiment
5. Modification example
6. Conclusion

1. Introduction

Radio access technologies such as LTE and NR have been studied in 3GPP. The LTE and NR are a type of cellular communication technology, and enable mobile communication of a terminal device by arranging in a cell shape a plurality of areas covered by a base station. Note that, in the following description, the "LTE" includes LTE-Advanced (LTE-A), LTE-Advanced Pro (LTE-A Pro), and evolved universal terrestrial radio access (EUTRA). In addition, the "NR" includes a new radio access technology (NRAT) and further EUTRA (FEUTRA).

The NR is a radio access technology (RAT) of a next generation (fifth generation: 5G) of the LTE. The NR is a radio access technology that can cope with various use cases including enhanced mobile broadband (eMBB), massive machine type communications (mMTC), and ultra-reliable and low latency communications (URLLC). The NR has been studied aiming at a technical framework corresponding to usage scenarios, requirement conditions, arrangement scenarios, and the like in these use cases.

Note that, in the following embodiment, an example in which a plurality of users simultaneously participates in a game provided by a cloud server will be described as one of use cases of the NR.

2. First Embodiment

<2-1. Overall Configuration of Communication System>

Figure 1:
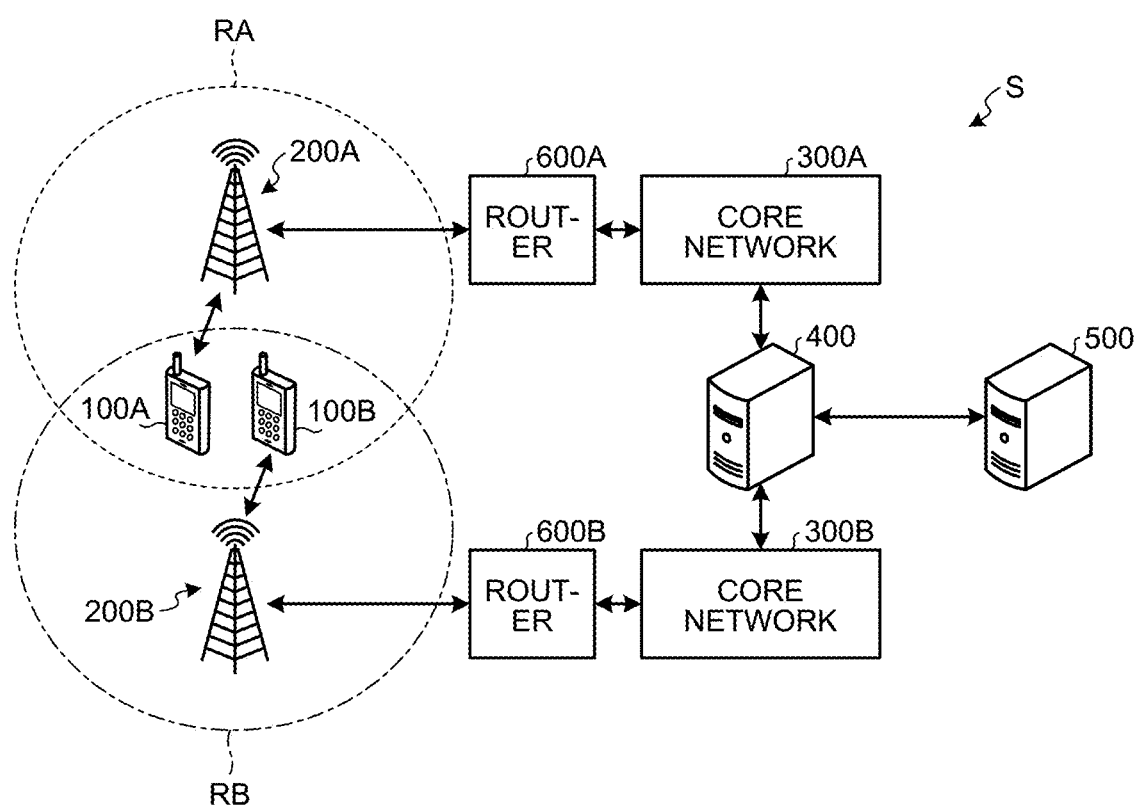
FIG. 1 is a diagram illustrating an example of a communication system according to a first embodiment.

A communication system according to a first embodiment will be described with reference to FIG. 1. FIG. 1 is a diagram illustrating an example of a communication system according to the first embodiment. As illustrated in FIG. 1, a communication system S includes a first wireless communication device 100A, a second wireless communication device 100B, a first base station device 200A belonging to a first public land mobile network (PLMN), a second base station device 200B belonging to a second PLMN, a first core network 300A, a second core network 300B, a data processing device 400, and a control device 500. Note that the communication system S may be a wireless communication system using a terrestrial network or a wireless communication system using a non-terrestrial network. Further, the communication system S may be a wireless communication system that utilizes a non-terrestrial network as a backhaul line of a terrestrial network. Note that the terrestrial network and the non-terrestrial network are not limited to a radio access scheme defined by the NR, and may be a radio network of a radio access scheme other than the NR, such as LTE, wideband code division multiple access (W-CDMA), or code division multiple access 2000 (cdma2000).

Note that FIG. 1 illustrates a case where each of the first base station device 200A and the second base station device 200B includes one base station, but may actually include two or more base stations. Further, the first base station device 200A and the second base station device 200B are respectively connected to the first core network 300A and the second core network 300B via, for example, routers 600A and 600B. Furthermore, as illustrated in FIG. 1, it is assumed that an area RA covered by the first base station device 200A and an area RB covered by the second base station device 200B at least partially overlap each other. In addition, an area covered by the base station device 200 is also referred to as a cell.

A cell provided by the base station device is referred to as a Serving cell. The Serving cell includes a primary cell (PCell) and a secondary cell (SCell). In a case where Dual Connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity) is provided to a UE (wireless communication device), the PCell and zero or one or more SCell(s) provided by a master node (MN) are referred to as a Master Cell Group. Further, the Serving cell may include a primary secondary cell or primary SCG cell (PSCell). That is, in a case where the Dual Connectivity is provided to the UE (wireless communication device), the PSCell and zero or one or more SCells(s) provided by a secondary node (SN) are referred to as a secondary cell group (SCG). Unless specially configured (for example, PUCCH on SCell), a physical uplink control channel (PUCCH) is transmitted in the PCell and the PSCell, but is not transmitted in the SCell. In addition, a radio link failure is detected in the PCell and the PSCell, but is not detected in the SCell (may not be detected). As described above, since the PCell and the PSCell have a special role in the Serving Cell(s), they are also referred to as special cells (SpCells). One downlink component carrier and one uplink component carrier may be associated with one cell. In addition, a system bandwidth corresponding to one cell may be divided into a plurality of bandwidth parts. In this case, one or more bandwidth parts may be set in the UE, and one bandwidth part may be used as an active BWP for the UE (wireless communication device). In addition, radio resources (for example, a frequency band, a numerology (subcarrier spacing), and a slot configuration (slot configuration)) that can be used by the UE (wireless communication device) may be different for each cell, each component carrier, or each BWP.

Further, in the following description, the concept of the base station device (Hereinafter, it is also referred to as a base station.) may include a relay device (Hereinafter, it is also referred to as a relay station (relay node).) and a donor base station that provides a wireless interface to the relay station. Furthermore, in the concept of the base station, the base station may be a base station having a function called integrated access and backhaul (IAB) that provides an access line to the wireless communication device and simultaneously provides a backhaul line to the relay device. In addition, the concept of the base station includes not only a structure having a function of the base station but also a device installed in the structure. The structure is, for example, a building such as a high-rise building, a house, a steel tower, a station facility, an airport facility, a harbor facility, or a stadium. Note that the concept of the structure includes not only a building but also a construction (non-building structure) such as a tunnel, a bridge, a dam, a wall, or an iron pillar, and equipment such as a crane, a gate, or a windmill. Further, the concept of the structure includes not only a structure on the ground (land) or under the ground but also a structure on water such as a platform or a megafloat, and a structure in water such as a marine observation facility. Furthermore, the base station may be configured by a set of a plurality of physical or logical devices. For example, in the embodiments of the present disclosure, the base station may be distinguished into a plurality of devices of a baseband unit (BBU) and a radio unit (RU), and may be interpreted as an aggregation of the plurality of devices. Additionally or alternatively, in the embodiments of the present disclosure, the base station may be either or both of the BBU and the RU. The BBU and the RU may be connected by a predetermined interface (e. g., eCPRI). Additionally or alternatively, the RU may be referred to as a remote radio unit (RRU) or radio dot (RD). Further or alternatively, the RU may correspond to a gNB-DU described later. Further or alternatively, the BBU may correspond to a gNB-CU to be described later. Additionally or alternatively, the RU may be a device integrally formed with an antenna. An antenna (e.g., an antenna integrally formed with the RU) included in the base station may adopt an advanced antenna system and support MIMO (e.g. FD-MIMO) or beamforming. In the advanced antenna system, the antenna (e.g., the antenna integrally formed with the RU) included in the base station may include, for example, 64 transmission antenna ports and 64 reception antenna ports.

Further, the base station may be a base station configured to be movable. For example, the base station may be a device installed in a moving body or may be a moving body itself. The moving body may be a mobile terminal such as a smartphone, a moving body (for example, a vehicle such as an automobile, a bus, a truck, a train, or a linear motor car) that moves on the ground (land), or a moving body (for example, a subway) that moves in the ground (for example, in a tunnel). Furthermore, the mobile body may be a mobile body (for example, a ship such as a passenger ship, a cargo ship, or a hovercraft) that moves over water or a mobile body (for example, submersibles such as submersible vessels, submarines, and unmanned underwater vehicles) that moves under water. In addition, the mobile body may be a mobile body (for example, an aircraft such as an airplane, an airship, or a drone) that moves inside the atmosphere or a space mobile body (for example, artificial bodies such as artificial satellites, spacecraft, space stations, and probes) that moves outside the atmosphere.

Note that a plurality of base stations may be connected to each other. The one or more base stations may be included in a radio access network (RAN). That is, the base station may be simply referred to as a RAN, a RAN node, an access network (AN), or an AN node. The RAN in the LTE is referred to as an enhanced universal terrestrial RAN (EUTRAN). The RAN in the NR is referred to as an NGRAN. RAN in W-CDMA (UMTS) is referred to as a UTRAN. The base station of the LTE is referred to as an evolved node B (eNodeB) or an eNB. That is, the EUTRAN includes one or more eNodeBs (eNBs). Further, the base station of the NR is referred to as a gNodeB or a gNB. That is, the NGRAN includes one or more gNBs. Furthermore, the EUTRAN may include a gNB (en-gNB) connected to a core network (EPC) in an LTE communication system (EPS). Similarly, the NGRAN may include an ng-eNB connected to a core network 5GC in a 5G communications system (5GS). Further or alternatively, when the base station is an eNB, a gNB, or the like, these base stations may be referred to as 3GPP Access. Further or alternatively, when the base station is an access point used in a wireless LAN or the like, these base stations may be referred to as non-3 GPP access. Further or alternatively, the base station may be an optical extension device called a remote radio head (RRH) or a remote radio unit (RRU), or may be configured to include the RRH or the RRU. Further or alternatively, when the base station is a gNB, the base station may be referred to as a combination of the gNB central unit (CU) and the gNB distributed unit (DU) described above or any of them. The gNB CU (Central Unit) hosts a plurality of upper layers (e.g. RRC, SDAP, PDCP) of the Access Stratum for communication with the UE. On the other hand, the gNB-DU hosts a plurality of lower layers (e.g. RLC, MAC, PHY) of the Access Stratum. That is, among the message and information generated by the base station device 200, an RRC message may be generated by the gNB CU, while a PHY message (e. g., DCI) may be generated by the gNB-DU. Further, alternatively, in the RRC configuration (semi-static notification), for example, some configurations (e.g., configuration regarding RLC, MAC, and PHY) such as IE: cellGroupConfig may be generated by the gNB-DU, and the remaining configurations (e.g., configuration regarding RRC, SDAP, and PDCP) may be generated by the gNB-CU. These configurations may be transmitted and received by an F1 interface to be described later. The base station may be configured to be able to communicate with other base stations. For example, when a plurality of base station devices are eNBs or a combination of an eNB and an en-gNB, the base stations may be connected by an X2 interface. Further or alternatively, when a plurality of base stations are gNBs or a combination of a gn-eNB and a gNB, the devices may be connected by an Xn interface. Further or alternatively, in a case where a plurality of base stations is a combination of a gNB central unit (CU) and a gNB distributed unit (DU), the devices may be connected by the above-described F1 interface. The message and information generated by the base station device may be communicated between a plurality of base stations (e.g. via X2, Xn, F1 interface).

The wireless communication device 100 is a terminal device handled by a user, and is, for example, a mobile phone, a smart device (Smartphone or tablet), a personal digital assistant (PDA), or a personal computer. Furthermore, the wireless communication device 100 may be a machine to machine (M2M) device or an Internet of things (IoT) device (For example, it may be referred to as MTC UE, NB-IoT UE, Cat.M UE, or NR-light UE.). Furthermore, the wireless communication device 100 may be a wireless communication device installed in a mobile body or may be a mobile body itself. Note that the wireless communication device 100 may be a relay station that relays satellite communication, or may be a base station that receives satellite communication. The wireless communication device 100 corresponds to both a terrestrial network and a non-terrestrial network. Therefore, the wireless communication device 100 can communicate not only with a ground station device but also with a non-ground station device.

Furthermore, in the LTE and the NR, the wireless communication device 100 that is a terminal device may be referred to as user equipment (UE). Alternatively, the wireless communication device 100 may be referred to as a mobile station (MS) or a wireless transmission reception unit (WTRU). Note that the wireless communication device 100 is also referred to as a mobile station, a mobile station device, or a terminal. In the embodiment of the present disclosure, the concept of the wireless communication device includes not only a portable terminal device such as a mobile terminal but also a device installed in a structure or a moving body, for example.

The core network 300 is, for example, an evolved packet core (EPC) or a 5G core network (5GC). The core network 300 includes a gateway device, a barrier exchanger, and the like, and is connected to a public network via the gateway device. The public network is, for example, a public data network such as the Internet, a regional IP network, or a telephone network (a mobile telephone network, a fixed telephone network, etc.). The gateway device is, for example, a server device connected to the Internet, a regional IP network, or the like. The barrier exchanger is, for example, an exchanger connected to a telephone network of a telephone company.

Note that the core network 300 may include a management device that manages a network. For example, the management device is a device that functions as a mobility management entity (MME) in the LTE or an access and mobility management function (AMF) in the NR. The MME is connected to the EUTRAN via an S1 interface, and controls non-access stratum (NAS) signaling with the UE and manages mobility of the UE. The AMF is connected to the NGRAN via an NG interface, and controls the non-access stratum (NAS) signaling with the UE and manages mobility of the UE.

Further, the management device is connected to each of the plurality of base station devices. The management device manages communication of the base station device. In addition to a control plane (C-Plane) node such as a management device, the core network 300 may include a user plane (U-Plane) node that transfers user data between a packet data network (PDN) or a data network (DN) and the RAN. The U-Plane node in the EPC may include a Serving Gateway (S-GW) or a PDN-Gateway (P-GW). The U-Plane node in the 5GC may include a U-Plane function (UPF). For example, the management device manages a position of the wireless communication device 100 (UE) in the communication system S for each wireless communication device 100 in units of areas (e.g. Tracking Area, RAN Notification Area) including a plurality of cells. Note that the management device may grasp and manage, for each wireless communication device 100 in units of cells, which base station (or which cell) the wireless communication device 100 is connected to, which base station (or which cell) the wireless communication device 100 exists in a communication area, and the like.

The data processing device 400 is, for example, a device in a form called a cloud server. Further, the data processing device 400 can be installed in a logical network called a data network (DN) in contact with the first core network 300A. The DN may be a network function (NF). Alternatively, the data processing device 400 itself may be a network function. Similarly, the data processing device 400 may be installed in a DN that is in contact with the second core network 300B.

Although FIG. 1 illustrates a case where the data processing device 400 and the control device 500 are devices disposed outside the first core network 300A and the second core network 300B, the present invention is not limited to this example.

For example, the data processing device 400 may be implemented in a DN of a third core network managed by a mobile virtual network operator (MVNO), and the control device 500 may be implemented as an application function (AF) of the third core network.

Furthermore, the third core network may be a home PLMN (HPLMN), and the first core network 300A (or the second core network 300B) may be a visitor PLMN (VPLMN). This point will be described with reference to FIG. 2.

Figure 2:
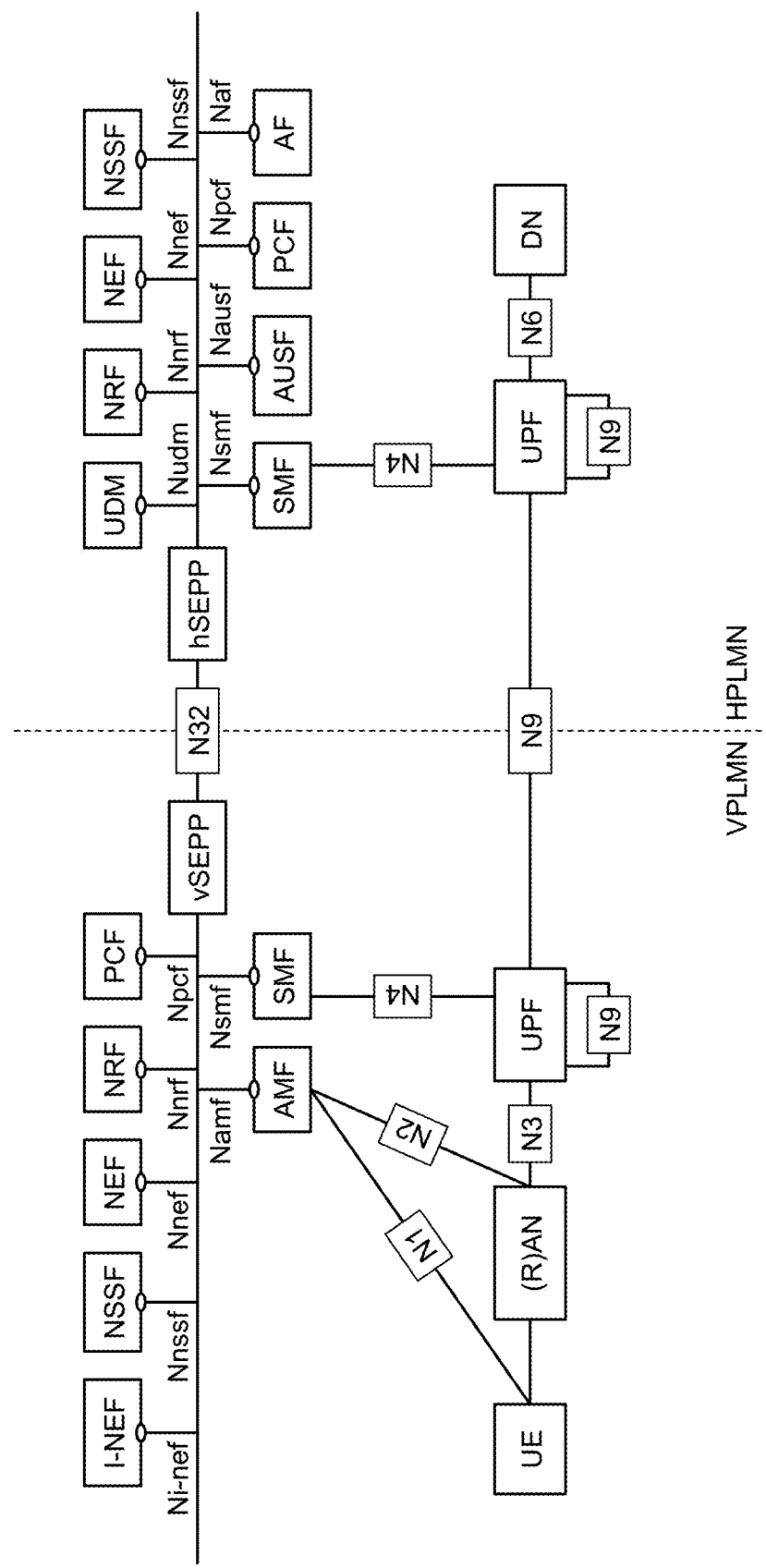
FIG. 2 is a diagram illustrating a 5G architecture for roaming.

FIG. 2 is a diagram illustrating a 5G architecture for roaming. In the 5G architecture (referred to 3GPP T523.501 4.2.4 Roaming reference architectures) for roaming illustrated in FIG. 2, the third core network is an HPLMN, and the first core network 300A (or the second core network 300B) is a VPLMN (Visitor PLMN), so that an MVNO can provide a wireless communication service via the first base station device 200A belonging to the first PLMN (or the second base station device 200B belonging to the second PLMN).

Note that, in order for the MVNO to have the configuration illustrated in FIG. 2, it is generally necessary to previously conclude a service level agreement (SLA) with each of a first mobile network operator (MNO) of the first PLMN and a second MNO of the second PLMN.

With the configuration illustrated in FIG. 2, the AF to be the control device 500 can communicate with each NF belonging to the control plane of the first core network 300A and each NF belonging to the control plane of the second core network 300B via a service based interface (SBI).

Here, each NF belonging to the control plane of the core network 300 is, for example, a network exposure function (NEF), a network repository function (NRF), a policy control function (PCF), an access and mobility management function (AMF), a session management function (SMF), or the like.

Further, the user who has a contract with the MVNO can select and set, for example, the first PLMN or the second PLMN as a PLMN destination to which a basic service is provided. Furthermore, the MVNO may provide the user with a service for switching to another PLMN other than the PLMN set as the PLMN destination for providing the basic service for a specific service or a specific application, for example, a multiplay game. Here, other PLMNs other than the PLMN may include a stand-alone non-public network (SNPN) operated by a non public network (NPN) operator. Here, the SNPN can be identified by a combination of a PLMN ID and a network identifier (NID).

Further, physical configurations of the first core network 300A and the second core network 300B are implementation dependent. For example, where a device corresponding to a network function NF called a user plane function (UPF) is placed with respect to the first base station device 200A and the second base station device 200B corresponding to a radio access network (RAN), and where a device corresponding to a DN is placed with respect to a device corresponding to the UPF are implementation dependent. Furthermore, the number of the routers 600 passing between the first base station device 200A or the second base station device 200B and the device corresponding to the DN also depends on the PLMN.

In the 5G, it is expected to provide a wireless communication service with a lower delay by end to end (E2E). In such a low-delay service, there is a concern that a difference in physical implementation such as an installation location of a device corresponding to the UPF or a device corresponding to the DN, a capacity of a fiber connecting devices in the core network 300, or the number of routers passing between the first base station device 200A or the second base station device 200B and a device corresponding to the DN greatly affects delay characteristics.

For example, although the first wireless communication device 100A and the second wireless communication device 100B play the same multi-play game at the place where the first wireless communication device 100A and the second wireless communication device 100B are close to each other, whether the first wireless communication device 100A receives a first wireless communication service via the first PLMN or the second wireless communication device 100B receives a second wireless communication service via the second PLMN affects the outcome of the game. If so, the game is no longer established. That is, in a case where a multiplay game is executed under wireless communication networks belonging to different PLMNs, it is important to solve a difference in communication quality such as a delay characteristic caused by such a difference in physical implementation. That is, when providing services to a plurality of users, it is important to minimize a difference in communication quality caused by a network configuration.

Hereinafter, a configuration of each device of the communication system S will be described.

<2-2. Configuration of Wireless Communication Device>

Figure 3:
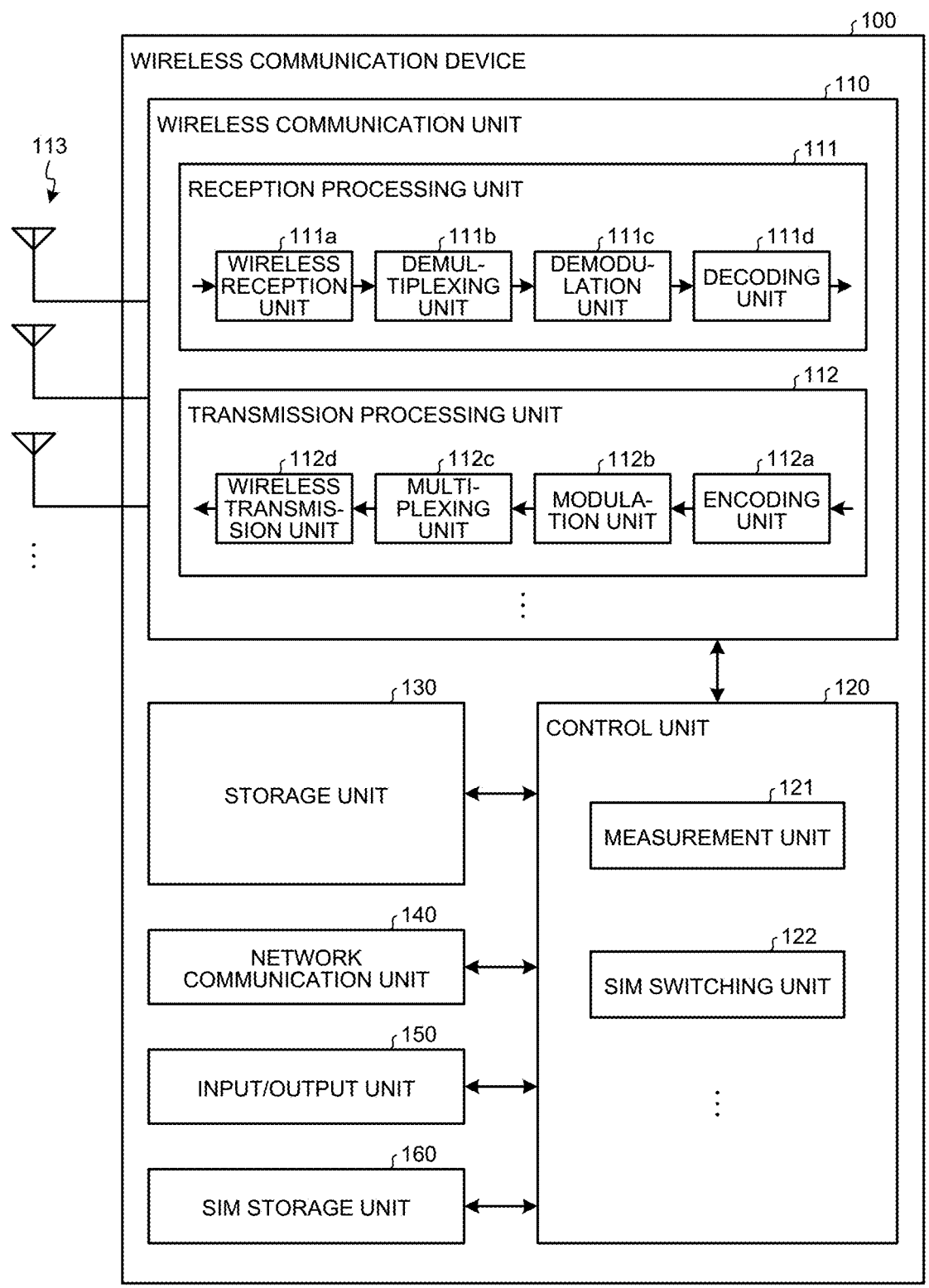
FIG. 3 is a diagram illustrating a configuration example of a wireless communication device according to the first embodiment.

First, a configuration of the wireless communication device 100 will be described. FIG. 3 is a diagram illustrating a configuration example of the wireless communication device 100 according to the first embodiment. The wireless communication device 100 includes a wireless communication unit 110, a control unit 120, a storage unit 130, a network communication unit 140, an input/output unit 150, and an SIM storage unit 160. Note that the configuration illustrated in FIG. 3 is a functional configuration, and a hardware configuration may be different from the functional configuration. Further, the functions of the wireless communication device 100 may be implemented in a distributed manner in a plurality of physically separated configurations. Furthermore, the configuration illustrated in FIG. 3 is an example, and the wireless communication unit 110, the control unit 120, the storage unit 130, the network communication unit 140, and the input/output unit 150 are not all essential components. For example, from the viewpoint of the embodiment of the present disclosure, at least the network communication unit 140 and the input/output unit 150 may not be essential components.

The wireless communication unit 110 is a wireless communication interface that wirelessly communicates with other wireless communication devices (for example, the base station device 200). The wireless communication unit 110 corresponds to one or a plurality of wireless access methods. For example, the wireless communication unit 110 is compatible with both the NR and the LTE. The wireless communication unit 110 may be compatible with W-CDMA or cdma2000 in addition to the NR or the LTE. The wireless communication unit 110 includes a reception processing unit 111, a transmission processing unit 112, and an antenna 113. The wireless communication unit 110 may include a plurality of reception processing units 111, a plurality of transmission processing units 112, and a plurality of antennas 113. Note that when the wireless communication unit 110 supports a plurality of wireless access methods, each unit in the wireless communication unit 110 can be configured individually for each wireless access method. For example, the reception processing unit 111 and the transmission processing unit 112 may be individually configured by the LTE and the NR.

The reception processing unit 111 processes a downlink signal received via the antenna 113. The reception processing unit 111 includes a wireless reception unit 111a, a demultiplexing unit 111b, a demodulation unit 111c, and a decoding unit 111d.

The wireless reception unit 111a performs down-conversion, removal of an unnecessary frequency component, control of an amplification level, quadrature demodulation, conversion to a digital signal, removal of a guard interval, extraction of a frequency domain signal by fast Fourier transform, and the like on the downlink signal. The demultiplexing unit 111b demultiplexes a downlink channel, a downlink synchronization signal, and a downlink reference signal from a signal output from the wireless reception unit 111a. The downlink channel is, for example, a channel such as a physical broadcast channel (PBCH), a physical downlink shared channel (PDSCH), or a physical downlink control channel (PDCCH). The demodulation unit 111c demodulates a received signal using a modulation scheme such as BPSK, QPSK, 16QAM, 64QAM, or 256QAM for the modulation symbol of the downlink channel. The decoding unit 111d performs a decoding process on demodulated encoded bits of the downlink channel. Decoded downlink data and downlink control information are output to the control unit 120.

The transmission processing unit 112 performs transmission processing of uplink control information and uplink data. The transmission processing unit 112 includes an encoding unit 112a, a modulation unit 112b, a multiplexing unit 112c, and a wireless transmission unit 112d.

The encoding unit 112a encodes uplink control information and uplink data input from the control unit 120 using an encoding method such as block encoding, convolutional encoding, turbo encoding, low density parity check (LDPC) encoding, or polar encoding. The modulation unit 112b modulates coded bits output from the encoding unit 112a by a predetermined modulation scheme such as BPSK, QPSK, 16QAM, 64QAM, or 256QAM. The multiplexing unit 112c multiplexes a modulation symbol of each channel and an uplink reference signal, and arranges the multiplexed symbols in a predetermined resource element. The wireless transmission unit 112d performs various types of signal processing on a signal from the multiplexing unit 112c. For example, the wireless transmission unit 112d performs processing such as conversion from a time domain to a frequency domain by inverse fast Fourier transform, addition of a guard interval, generation of a baseband digital signal, conversion to an analog signal, quadrature modulation, up-conversion, removal of an extra one frequency component, and amplification of power. A signal generated by the transmission processing unit 112 is transmitted from the antenna 113.

The storage unit 130 is a storage device capable of reading and writing data, such as a DRAM, an SRAM, a flash memory, or a hard disk. The storage unit 130 functions as a storage unit of the wireless communication device 100.

The network communication unit 140 is a communication interface for communicating with other devices. For example, the network communication unit 140 is a LAN interface such as an NIC. The network communication unit 140 may be a wired interface or a wireless interface. The network communication unit 140 functions as a network communication unit of the wireless communication device 100. The network communication unit 140 communicates with other devices under the control of the control unit 120.

The input/output unit 150 is a user interface for exchanging information with a user. For example, the input/output unit 150 is an operation device for the user to perform various operations, such as a keyboard, a mouse, an operation key, a touch panel, a controller, and a camera. Alternatively, the input/output unit 150 is a display device such as a liquid crystal display or an organic electroluminescence (EL) display. The input/output unit 150 may be a sound device such as a speaker, a buzzer, or a microphone. Further, the input/output unit 150 may be a lighting device such as a light emitting diode (LED) lamp. Furthermore, the input/output unit 150 may be an inertial measurement unit (IMU) that detects a motion of the user. Here, the inertial measurement device includes, for example, an acceleration sensor, a rotation angle acceleration sensor (gyro sensor), a magnetic field sensor, an atmospheric pressure sensor, a temperature sensor, and the like. The input/output unit 150 functions as an input/output unit (input unit, output unit, operation unit, or notification unit) of the wireless communication device 100.

The SIM storage unit 160 is, for example, a slot that stores a subscriber identity module (SIM). Here, the SIM is a module storing information that can identify a mobile network operator (MNO) or a subscriber of a wireless communication service provided by the MVNO, and may be, for example, a universal subscriber identity module (USIM) used in the LTE or a next generation (NextGen) USIM for the 5G. Further, the SIM is not limited to a removable SIM card, and may be, for example, an embedded SIM (eSIM) or an integrated SIM configured inside the SoC. Furthermore, the eSIM and the integration SIM may be downloadable SIMs that can write or update held contents via an external device or a wired or wireless network. The downloadable SIM may be called, for example, a soft SIM or a software SIM.

In addition, the SIM stores a list of PLMNs to which the wireless communication device 100 can be connected (Hereinafter referred to as a PLM list.). The PLMN list includes, for example, an ID (PLMN ID) for identifying a plurality of PLMNs to which the wireless communication device 100 can be connected.

Taking FIG. 1 as an example, the SIM of each of the first wireless communication device 100A and the second wireless communication device 100B includes a first PLMN ID that identifies a first PLMN and a second PLMN ID that identifies a second PLMN. Note that the PLMN list may include the PLMN ID of the PLMN owned by the MNO with which the MNO has a roaming agreement, in addition to the PLMN owned by the MNO.

The control unit 120 is a controller that controls each unit of the wireless communication device 100. The control unit 120 is realized by, for example, a processor such as a CPU or an MPU. For example, the control unit 120 is realized by a processor executing various programs stored in a storage device inside the wireless communication device 100 using a RAM or the like as a work area. Note that the control unit 120 may be realized by an integrated circuit such as an ASIC or an FPGA. Any of the CPU, the MPU, the ASIC, and the FPGA can be regarded as a controller.

As illustrated in FIG. 3, the control unit 120 includes at least a measurement unit 121 and a SIM switching unit 122. Each block (the measurement unit 121 and the SIM switching unit 122) constituting the control unit 120 is a functional block indicating a function of the control unit 120. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. A configuration method of the functional block is arbitrary. Note that the control unit 120 may be configured by a functional unit different from the above-described functional block.

The operation of each block (the measurement unit 121 and the SIM switching unit 122) constituting the control unit 120 will be described later.

<2-3. Configuration of Base Station Device>

Figure 4:
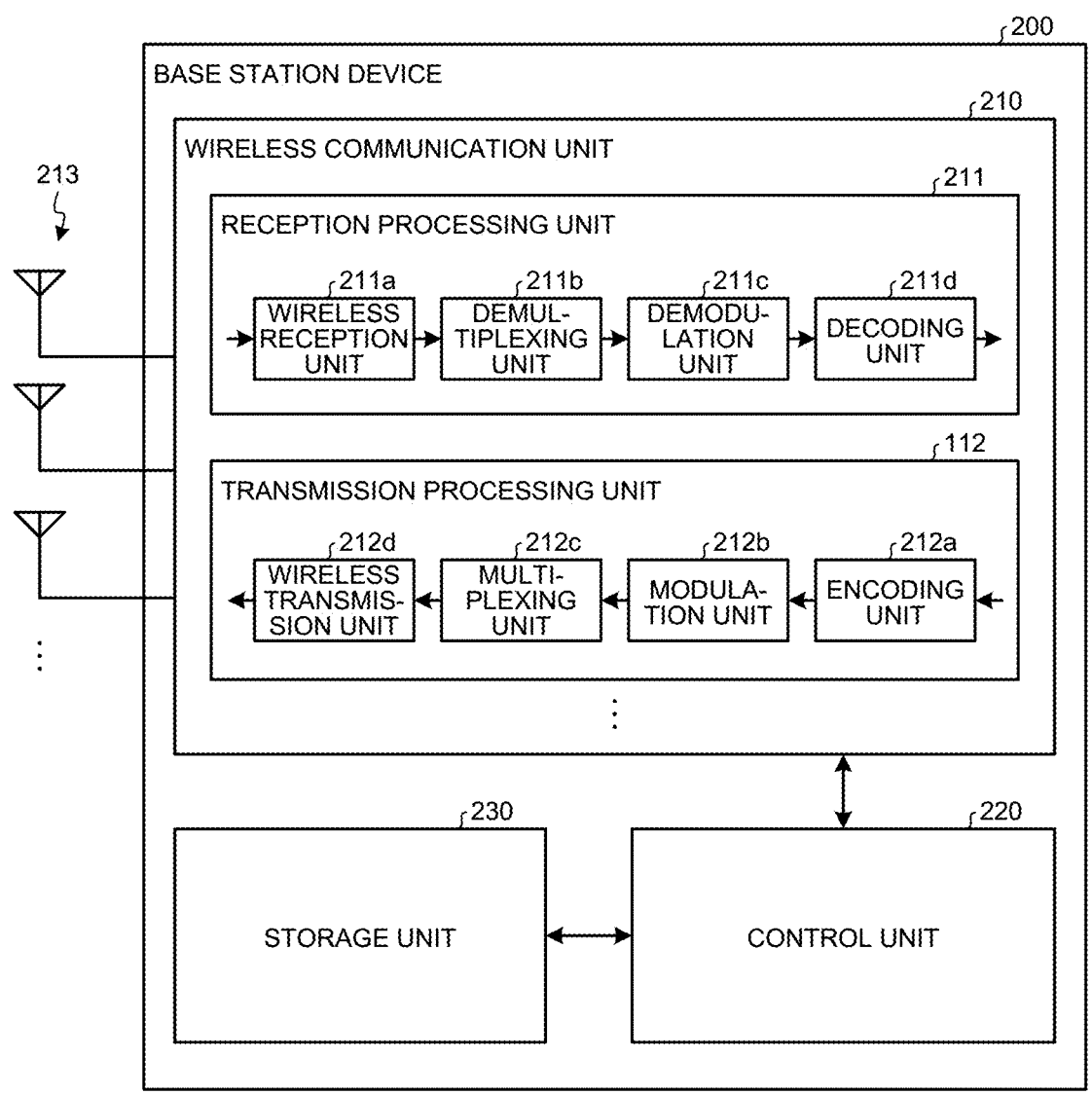
FIG. 4 is a diagram illustrating a configuration example of a base station device according to the first embodiment.

Next, a configuration of the base station device 200 will be described. FIG. 4 is a diagram illustrating a configuration example of the base station device 200 according to the first embodiment. The base station device 200 includes a wireless communication unit 210, a control unit 220, and a storage unit 230. Note that the configuration illustrated in FIG. 4 is a functional configuration, and a hardware configuration may be different from the functional configuration. Further, functions of the base station device 200 may be implemented in a distributed manner in a plurality of physically separated configurations.

The wireless communication unit 210 is a wireless communication interface that wirelessly communicates with other wireless communication devices (for example, another base station device 200 such as the wireless communication device 100 or a relay station). The wireless communication unit 210 corresponds to one or a plurality of wireless access methods. For example, the wireless communication unit 210 is compatible with both the NR and the LTE. The wireless communication unit 210 may be compatible with W-CDMA or cdma2000 in addition to the NR or the LTE. The wireless communication unit 210 includes a reception processing unit 211, a transmission processing unit 212, and an antenna 213. The wireless communication unit 210 may include a plurality of reception processing units 211, a plurality of transmission processing units 212, and a plurality of antennas 213. Note that when the wireless communication unit 210 supports a plurality of wireless access methods, each unit in the wireless communication unit 210 can be configured individually for each wireless access method. For example, the reception processing unit 211 and the transmission processing unit 212 may be individually configured by the LTE and the NR.

The reception processing unit 211 processes an uplink signal received via the antenna 213. The reception processing unit 211 includes a wireless reception unit 211a, a demultiplexing unit 211b, a demodulation unit 211c, and a decoding unit 211d.

The wireless reception unit 211a performs down-conversion, removal of an unnecessary frequency component, control of an amplification level, quadrature demodulation, conversion to a digital signal, removal of a guard interval, extraction of a frequency domain signal by fast Fourier transform, and the like on the uplink signal. The demultiplexing unit 211b demultiplexes an uplink channel such as a physical uplink shared channel (PUSCH) or a physical uplink control channel (PUCCH) and an uplink reference signal from a signal output from the wireless reception unit 211a. The demodulation unit 211c demodulates a received signal using a modulation scheme such as binary phase shift keying (BPSK) or quadrature phase shift keying (QPSK) with respect to a modulation symbol of the uplink channel. The modulation scheme used by the demodulation unit 211c may be 16 quadrature amplitude modulation (QAM), 64QAM, 256QAM, or the like. The decoding unit 211d performs a decoding process on demodulated encoded bits of the uplink channel. Decoded uplink data and uplink control information are output to the control unit 23.

The transmission processing unit 212 performs transmission processing of downlink control information and downlink data. The transmission processing unit 212 includes an encoding unit 212a, a modulation unit 212b, a multiplexing unit 212c, and a wireless transmission unit 212d.

The encoding unit 212a encodes downlink control information and downlink data input from the control unit 23 using an encoding method such as block encoding, convolutional encoding, turbo encoding, LDPC encoding, polar encoding, or the like. The modulation unit 212b modulates coded bits output from the encoding unit 212a by a predetermined modulation scheme such as BPSK, QPSK, 16QAM, 64QAM, or 256QAM. The multiplexing unit 212c multiplexes a modulation symbol of each channel and a downlink reference signal, and arranges the multiplexed symbols in a predetermined resource element. The wireless transmission unit 212d performs various types of signal processing on a signal from the multiplexing unit 212c. For example, the wireless transmission unit 212d performs processing such as conversion from a time domain to a frequency domain by inverse fast Fourier transform, addition of a guard interval, generation of a baseband digital signal, conversion to an analog signal, quadrature modulation, up-conversion, removal of an extra frequency component, and amplification of power. A signal generated by the transmission processing unit 212 is transmitted from the antenna 213.

The storage unit 230 is a storage device capable of reading and writing data, such as a DRAM, an SRAM, a flash memory, or a hard disk. The storage unit 230 functions as a storage unit of the base station device 200.

The control unit 220 is a controller that controls each unit of the base station device 200. The control unit 220 is realized by, for example, a processor such as a central processing unit (CPU) or a micro processing unit (MPU). For example, the control unit 220 is realized by a processor executing various programs stored in a storage device inside the base station device 200 using a random access memory (RAM) or the like as a work area. Note that the control unit 220 may be realized by an integrated circuit such as an application specific integrated circuit (ASIC) or a field programmable gate array (FPGA). Any of the CPU, the MPU, the ASIC, and the FPGA can be regarded as a controller.

Note that the operation of the control unit 220 will be described later.

<2-4. Configuration of Data Processing Device>

Figure 5:
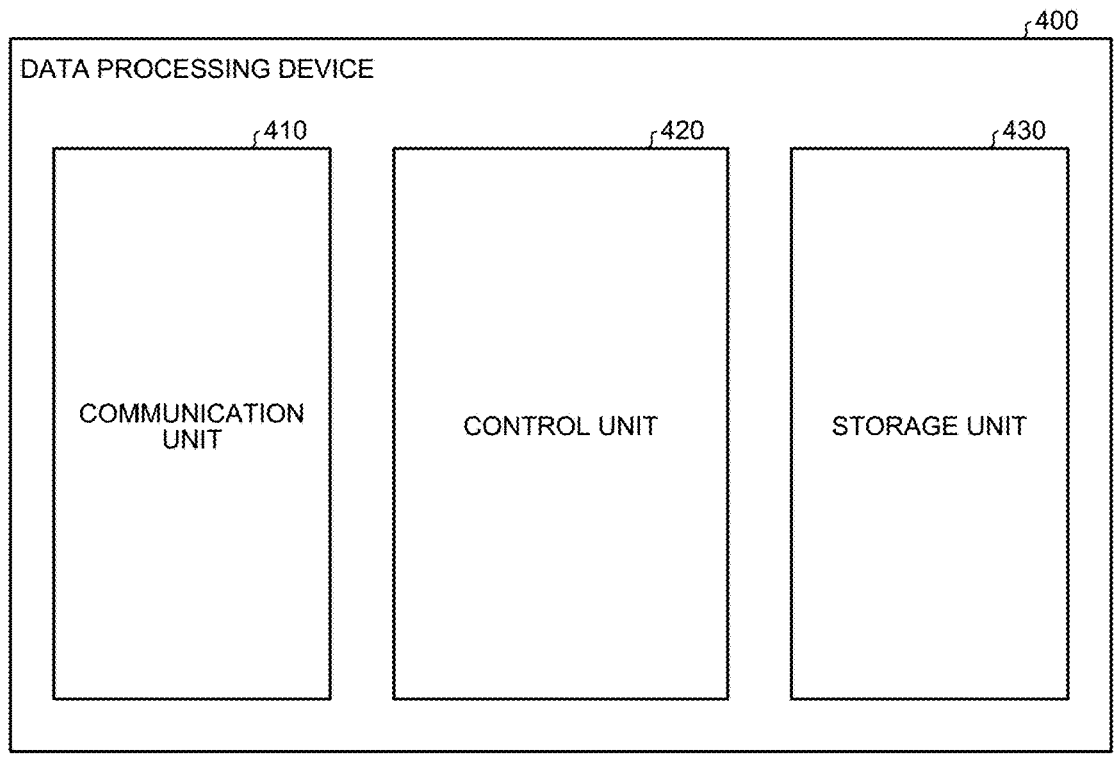
FIG. 5 is a diagram illustrating a configuration example of a data processing device according to the first embodiment.

Next, a configuration of the data processing device 400 will be described. FIG. 5 is a diagram illustrating a configuration example of the data processing device 400 according to the first embodiment. The data processing device 400 includes a communication unit 410, a control unit 420, and a storage unit 430. Note that the configuration illustrated in FIG. 5 is a functional configuration, and a hardware configuration may be different from the functional configuration. Further, functions of the data processing device 400 may be implemented in a distributed manner in a plurality of physically separated configurations.

The communication unit 410 is a communication interface for communicating with other devices. The communication unit 410 may be a network interface or a device connection interface. The communication unit 410 has a function of directly or indirectly connecting to a network function such as a DN of the core network 300.

For example, the communication unit 410 may include a local area network (LAN) interface such as a network interface card (NIC), or may include a USB interface including a universal serial bus (USB) host controller, a USB port, and the like. Furthermore, the communication unit 410 may be a wired interface or a wireless interface.

The communication unit 410 functions as a communication unit of the data processing device 400. The communication unit 410 communicates with the network functions of the core network 300 under the control of the control unit 420.

The storage unit 430 is a storage device capable of reading and writing data, such as a DRAM, an SRAM, a flash memory, or a hard disk. The storage unit 430 functions as a storage unit of the data processing device 400.

The control unit 420 is a controller that controls each unit of the data processing device 400. The control unit 420 is realized by, for example, a processor such as a central processing unit (CPU) or a micro processing unit (MPU). For example, the control unit 420 is implemented by a processor executing various programs stored in a storage device inside the data processing device 400 using a random access memory (RAM) or the like as a work area. Note that the control unit 420 may be realized by an integrated circuit such as an application specific integrated circuit (ASIC) or a field programmable gate array (FPGA). Any of the CPU, the MPU, the ASIC, and the FPGA can be regarded as a controller.

Note that the operation of the control unit 420 will be described later.

<2-5. Configuration of Control Device>

Figure 6:
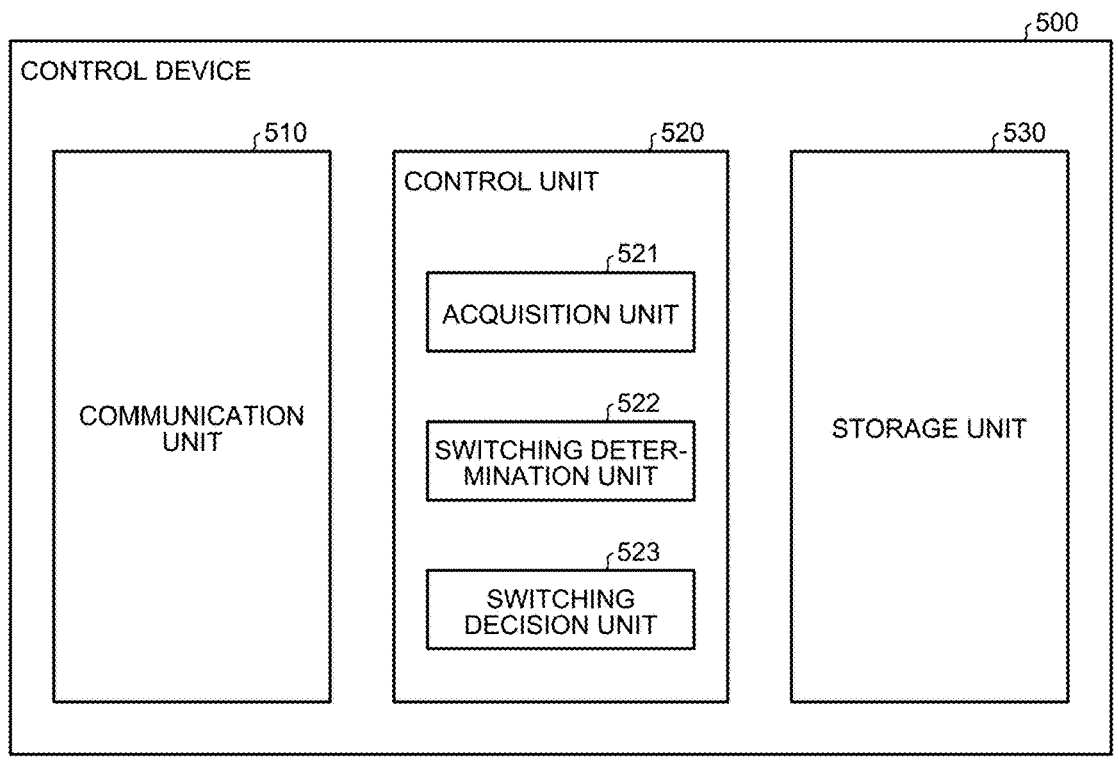
FIG. 6 is a diagram illustrating a configuration example of a control device according to the first embodiment.

Next, a configuration of a control device 500 will be described. FIG. 6 is a diagram illustrating a configuration example of the control device 500 according to the first embodiment. The control device 500 includes a communication unit 510, a control unit 520, and a storage unit 530. Note that the configuration illustrated in FIG. 6 is a functional configuration, and a hardware configuration may be different from the functional configuration. Further, functions of the control device 500 may be implemented in a distributed manner in a plurality of physically separated configurations.

The communication unit 510 is a communication interface for communicating with other devices (for example, the data processing device 400). The communication unit 510 may be a network interface or a device connection interface. The communication unit 510 has a function of directly or indirectly connecting to the data processing device 400.

For example, the communication unit 510 may include a local area network (LAN) interface such as a network interface card (NIC), or may include a USB interface including a universal serial bus (USB) host controller, a USB port, and the like. Furthermore, the communication unit 510 may be a wired interface or a wireless interface.

The communication unit 510 functions as a communication unit of the control device 500. The communication unit 510 communicates with the data processing device 400 under the control of the control unit 520.

The storage unit 530 is a storage device capable of reading and writing data, such as a DRAM, an SRAM, a flash memory, or a hard disk. The storage unit 530 functions as a storage unit of the control device 500.

The control unit 520 is a controller that controls each unit of the control device 500. The control unit 520 is realized by, for example, a processor such as a central processing unit (CPU) or a micro processing unit (MPU). For example, the control unit 520 is implemented by a processor executing various programs stored in a storage device inside the control device 500 using a random access memory (RAM) or the like as a work area. Note that the control unit 520 may be realized by an integrated circuit such as an application specific integrated circuit (ASIC) or a field programmable gate array (FPGA). Any of the CPU, the MPU, the ASIC, and the FPGA can be regarded as a controller.

As illustrated in FIG. 6, the control unit 520 includes at least an acquisition unit 521, a switching determination unit 522, and a switching decision unit 523. Each block (the acquisition unit 521, the switching determination unit 522, and the switching decision unit 523) constituting the control unit 520 is a functional block indicating a function of the control unit 520. These functional blocks may be software blocks or hardware blocks. For example, each of the functional blocks described above may be one software module realized by software (including a microprogram), or may be one circuit block on a semiconductor chip (die). Of course, each functional block may be one processor or one integrated circuit. A configuration method of the functional block is arbitrary. Note that the control unit 520 may be configured by a functional unit different from the above-described functional block.

The operation of each block (the acquisition unit 521, the switching determination unit 522, and the switching decision unit 523) constituting the control unit 520 will be described later.

<2-6. Operation Example of Communication System>

Next, an operation example of the communication system S will be described. In the communication system S according to the first embodiment, although details will be described later, switching processing of switching the PLMNs is executed such that terminal devices (wireless communication devices 100) of a plurality of users simultaneously participating in multiplay become the same PLMN. As a result, a plurality of users can use wireless communication services of the same MNO (or MVNO) via the same PLMN, and thus, for example, when a multiplay game is played, a difference in communication quality between the users can be suppressed.

<Registration Processing>

Hereinafter, the PLMN switching processing will be specifically described, and first, registration processing performed before the PLMN switching processing will be described. The registration processing is executed by the wireless communication device 100 (ME: Mobile Equipment). First, in the registration processing, the wireless communication device 100 reads the PLMN list from the SIM stored in the SIM storage unit 160 and selects a home PLMN (HPLMN) from the PLMN list. Then, the wireless communication device 100 transmits a Registration Request to an access and mobility management function (AMF) belonging to the selected HPLMN via the wireless communication unit 110.

For example, the first wireless communication device 100A illustrated in FIG. 1 transmits the Registration Request to an AMF of the first core network 300A via the first base station device 200A in which the HPLMN is a first PLMN and belongs to the first PLMN.

Similarly, the second wireless communication device 100B illustrated in FIG. 1 transmits a Registration Request to an AMF of the second core network 300B via the second base station device 200B in which the HPLMN is a second PLMN and belongs to the second PLMN.

Then, upon receiving the Registration Request from the wireless communication device 100 and permitting the registration, the AMF of the core network 300 transmits registration acceptance (Accept) to the wireless communication device 100, and the registration processing is completed.

When the registration processing is completed, the wireless communication device 100 enters a communication range (Registered state) with respect to the communication via the core network 300 belonging to the HPLMN. On the other hand, the wireless communication device 100 is out of the communication range for communication via the core network 300 not belonging to the HPLMN (Deregistered state).

Subsequently, after the registration processing, the wireless communication device 100 establishes a protocol data unit (PDU) session with a DN which is a network function of the core network 300 in order to receive a wireless communication service.

For example, the first wireless communication device 100A illustrated in FIG. 1 establishes a PDU session with a DN that belongs to the first core network 300A, to receive the first wireless communication service.

Similarly, the second wireless communication device 100B illustrated in FIG. 1 establishes a PDU session with a DN that belongs to the second core network 300B, to receive the second wireless communication service.

<2-7. PLMN Switching Processing>

Next, PLMN switching processing will be described. The PLMN switching processing is executed by the wireless communication device 100, and decision processing as to whether or not to execute the switching processing is executed by the control device 500. Specifically, the decision processing of the control device 500 is performed on the basis of various types of information received from the wireless communication device 100.

For example, the measurement unit 121 of the wireless communication device 100 measures various types of information on the basis of various signals received via the base station device 200 belonging to the HPLMN. For example, the measurement unit 121 receives a reference signal RS (Reference Signal) transmitted from an eNB or an ng-eNB corresponding to the first base station device 200A or the second base station device 200B, and measures reference signal received power (RSRP), reference signal received quality (RSRQ), or signal-to-interference plus noise power ratio (SINR).

Further, the measurement unit 121 may receive a secondary synchronization signal (SSS) included in a synchronization signal (SS)/physical broadcast channel (PBCH) block transmitted from a gNB or an en-gNB corresponding to the first base station device 200A or the second base station device 200B, and measure RSRP, RSRQ, or SINR. Here, instead of SSS, a demodulation reference signal (DMRS) or a channel state information (CSI) RS used for PBCH may be used for measurement of RSRP, RSRQ, or SINR.

Further, the measurement unit 121 measures a data rate when receiving data from the data processing device 400. Here, at the time of measuring the data rate, statistical processing is performed, and a maximum data rate, a minimum data rate, an average data rate, and a variance are measured.

In addition, the measurement unit 121 measures a delay time with respect to a target device. For example, the wireless communication device 100 sets the data processing device 400 as a target device, and measures a round trip time (RTT) with the data processing device 400 as a delay time using Ping.

Further, the measurement unit 121 receives reference signals of position information transmitted from the plurality of base station devices 200 and measures the position of the wireless communication device 100. Furthermore, in a case where the measurement unit 121 is equipped with a global navigation satellite system (GNSS) receiver represented by a global positioning system (GPS), the position of the wireless communication device 100 may be measured via the GNSS.

The control device 500 illustrated in FIG. 1 receives the measurement result of the data rate, the measurement result of the delay time, and the measurement result of the position from the measurement unit 121 of each of the first wireless communication device 100A and the second wireless communication device 100B at a fixed or variable cycle. For example, the measurement unit 121 transmits the measurement result of the data rate, the measurement result of the RTT, and the measurement result of the position voluntarily or in response to a request from the control device 500.

Figure 7:
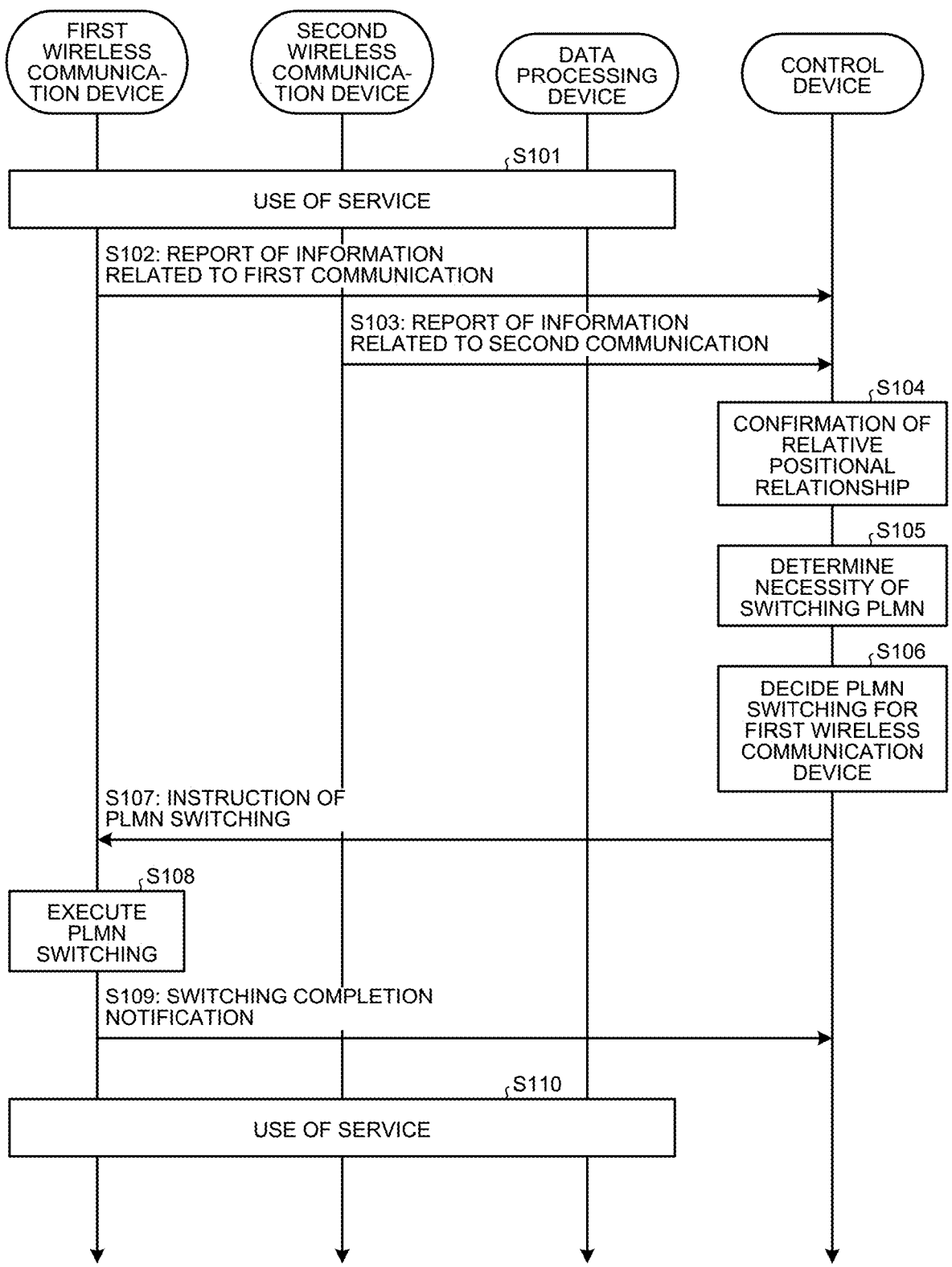
FIG. 7 is a diagram illustrating an example of a signaling flow accompanying SIM switching processing of the communication system according to the first embodiment.

FIG. 7 is a diagram illustrating an example of a signaling flow accompanying SIM switching processing of the communication system S according to the first embodiment. In FIG. 7, it is assumed that the first wireless communication device 100A uses the first wireless communication service provided by the first PLMN via the first base station device 200A, and the second wireless communication device 100B uses the second wireless communication service provided by the second PLMN via the second base station device 200B (Step S101).

First, the first wireless communication device 100A transmits a report of information related to the first communication to the control device 500 (Step S102). Here, the information related to the first communication includes identification information for identifying the first wireless communication service used by the first wireless communication device 100A and information related to the position of the first wireless communication device 100A. The identification information is, for example, a PLMN ID for identifying the first PLMN, information for identifying an application (service) executing via the first wireless communication service, for example, a process ID for identifying a process in a multiplay game being processed by the data processing device 400, or the like. Note that the process ID may be, for example, a process ID managed by an operating system (OS) of the data processing device 400. That is, the control device 500 may acquire the process ID in the identification information from the data processing device 400. Furthermore, the information related to the first communication may include a measurement result of the data rate, a measurement result of the delay time, and the like.

In addition, the second wireless communication device 100B transmits a report of information related to the second communication to the control device 500 (Step S103). Here, the information related to the second communication includes identification information for identifying the second wireless communication service used by the second wireless communication device 100B and information related to the position of the second wireless communication device 100B. The identification information is, for example, a PLMN ID for identifying the second PLMN, information for identifying an application (service) executing via the second wireless communication service, for example, a process ID for identifying a process in a multiplay game being processed by the data processing device 400, or the like. Note that the process ID may be, for example, a process ID managed by an operating system (OS) of the data processing device 400. That is, the control device 500 may acquire the process ID in the identification information from the data processing device 400. Furthermore, the information related to the second communication may include a measurement result of the data rate, a measurement result of the delay time, and the like.

Instead of the process ID, an ID (task ID, session ID) for identifying a task or a session managed by the OS of the data processing device 400 may be used.

Subsequently, the switching determination unit 522 of the control device 500 confirms a relative positional relationship between the first wireless communication device 100A and the second wireless communication device 100B on the basis of the information related to the first communication acquired by the acquisition unit 542 from the first wireless communication device 100A and the information related to the second communication acquired from the second wireless communication device 100B (Step S104). The relative positional relationship may be information indicating a distance between the first wireless communication device 100A and the second wireless communication device 100B, or may be information indicating whether or not the first wireless communication device 100A and the second wireless communication device 100B are located in the same building or the same room. Alternatively, in Step S104, the switching determination unit 522 of the control device 500 may recognize the position information (e.g. position information based on GNSS and GPS (e.g., latitude, longitude, altitude, etc.)) of each of the first wireless communication device 100A and the second wireless communication device 100B, and confirm the relative positional relationship between the first wireless communication device 100A and the second wireless communication device 100B on the basis of the position information.

Then, the switching determination unit 522 of the control device 500 determines the necessity of switching the PLMN on the basis of the information related to the first communication acquired from the first wireless communication device 100A and the information related to the second communication acquired from the second wireless communication device 100B (Step S105). For example, the switching determination unit 522 determines that switching of the PLMN is necessary in a case where the first wireless communication device 100A and the second wireless communication device 100B located at positions relatively close to each other use wireless communication services of different PLMNs and are using a multi-play game having the same process ID (alternatively, a task ID or a session ID) or preparing to start (standing by) a multi-play game having the same process ID (alternatively, a task ID or a session ID). Note that the first wireless communication device 100A and the second wireless communication device 100B exist at positions relatively close to each other when the distance between the first wireless communication device 100A and the second wireless communication device 100B is less than a predetermined distance or when the first wireless communication device 100A and the second wireless communication device 100B are located in the same building, the same room, or the same square. In another aspect, the fact that the first wireless communication device 100A and the second wireless communication device 100B exist at positions relatively close to each other may mean that at least cells (serving cells) to which the first wireless communication device 100A and the second wireless communication device 100B belong are the same when the PLMN is switched, or that the serving cells are the same and a difference in radio quality (e. g., RSRP, RSRQ, SINR) or communication quality (e.g., throughput, delay time) is less than a predetermined threshold between the first wireless communication device 100A and the second wireless communication device 100B.

Then, for example, when deciding to switch from the first PLMN to the second PLMN for the first wireless communication device 100A (Step S106), the switching decision unit 523 of the control device 500 instructs the first wireless communication device 100A to switch from the first PLMN to the second PLMN (Step S107).

Subsequently, when receiving the instruction to switch from the first PLMN to the second PLMN from the control device 500 via the first base station device 200A, the SIM switching unit 122 of the first wireless communication device 100A switches the SIM to execute switching from the first PLMN to the second PLMN (Step S108).

Subsequently, after performing the connection processing with the second base station device 200B, the first wireless communication device 100A transmits a switching completion notification indicating that the switching from the first PLMN to the second PLMN is completed to the control device 500 via the second base station device 200B (Step S109).

Then, since the first wireless communication device 100A and the second wireless communication device 100B can perform the second wireless communication service provided by the same second PLMN, the multiplay game can be enjoyed in a homogeneous wireless communication environment.

Note that FIG. 7 illustrates an example in which the control device 500 instructs the first wireless communication device 100A to switch from the first PLMN to the second PLMN. However, for example, the control device may instruct the second wireless communication device 100B to switch from the second PLMN to the first PLMN.

Here, the switching decision unit 523 of the control device 500 can arbitrarily select whether the first wireless communication device 100A performs switching from the first PLMN to the second PLMN or the second wireless communication device 100B performs switching from the second PLMN to the first PLMN.

Alternatively, the switching decision unit 523 may give information on a priority level as the switching destination to each of the first PLMN and the second PLMN, and decide the PLMN as the switching destination based on the priority level.

In addition, the switching decision unit 523 may decide the PLMN to be the switching destination on the basis of the measurement result of the data rate or the measurement result of the delay time (However, these are not essential components for PLMN switching). Specifically, the switching decision unit 523 may decide switching from the first PLMN to the second PLMN or switching from the second PLMN to the first PLMN based on a measurement result of the delay time (measurement result of the first delay time) obtained from first wireless communication device 100A that uses the first wireless communication service provided by the first PLMN and a measurement result of the delay time (measurement result of the second delay time) obtained from second wireless communication device 100B that uses the second wireless communication service provided by the second PLMN. For example, when the second delay time is shorter than the first delay time, the switching decision unit 523 decides switching from the first PLMN to the second PLMN. That is, the switching decision unit 523 decides a PLMN with a shorter delay time as the switching destination.

In addition, the control device 500 may decide the switching from the first PLMN to the second PLMN or the switching from the second PLMN to the first PLMN based on the measurement result of the data rate (measurement result of the first data rate) obtained from the first wireless communication device 100A using the first wireless communication service provided by the first PLMN and the measurement result of the data rate (measurement result of the second data rate) obtained from the second wireless communication device 100B using the second wireless communication service provided by the second PLMN. For example, when the second data rate is larger than the first data rate, the switching decision unit 523 decides switching from the first PLMN to the second PLMN. That is, the control device 500 decides a PLMN having a higher data rate as the switching destination.

In addition, or alternatively, when the control device 500 decides that the first wireless communication device 100A and the second wireless communication device 100B are caused to execute the multiplay game having the same process ID (for example, when the necessity of switching the PLMN is determined in Step S105 in FIG. 7), both the first wireless communication device 100A belonging to the first PLMN and the second wireless communication device 100B belonging to the second PLMN may switch the attribute destination to the third PLMN. That is, the PLMN (third PLMN) may be provided for the multiplay game, and in a case where it is determined in Step S105 of FIG. 7 that the PLMN needs to be switched, the attribution of the wireless communication device that performs the multiplay game may be switched to the third PLMN.

As described above, according to the first embodiment, even in a case where a plurality of users such as friends who exist in adjacent areas start the same multiplay service via wireless communication services of different communication carriers, switching the PLMN so that the wireless communication service of the same communication carrier can be used can contribute to ensuring uniform Quality of Experience (QoE) for the plurality of users. That is, it is possible to contribute to suppressing a difference in communication quality caused by a network configuration when providing a service to a plurality of users.

3. Second Embodiment

Next, a communication system S according to a second embodiment will be described. The second embodiment is different from the first embodiment in that, for example, in a case where a plurality of users participates in the same multi-play game, the transmission timing of data from the data processing device 400 to each wireless communication device 100 is changed on the basis of the delay time of each wireless communication device 100.

Note that the wireless communication device 100 of each of the plurality of users may be in a situation in which the wireless communication service is used by different PLMNs, or may be in a situation in which the wireless communication service is used by the same PLMN by the switching process described in the first embodiment.

Hereinafter, the second embodiment will be described focusing on differences from the first embodiment. A configuration of the communication system S according to the second embodiment is the same as that of the communication system S according to the first embodiment illustrated in FIG. 1.

Figure 8:
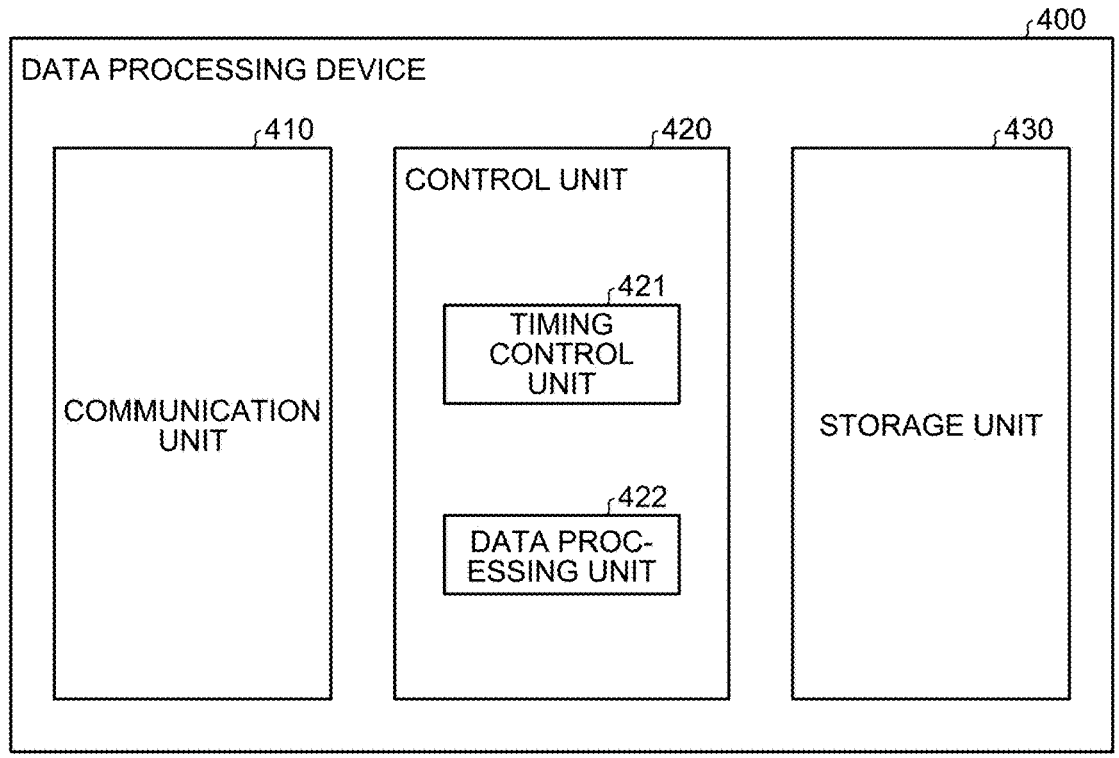
FIG. 8 is a diagram illustrating a configuration example of a data processing device according to a second embodiment.
Figure 9:
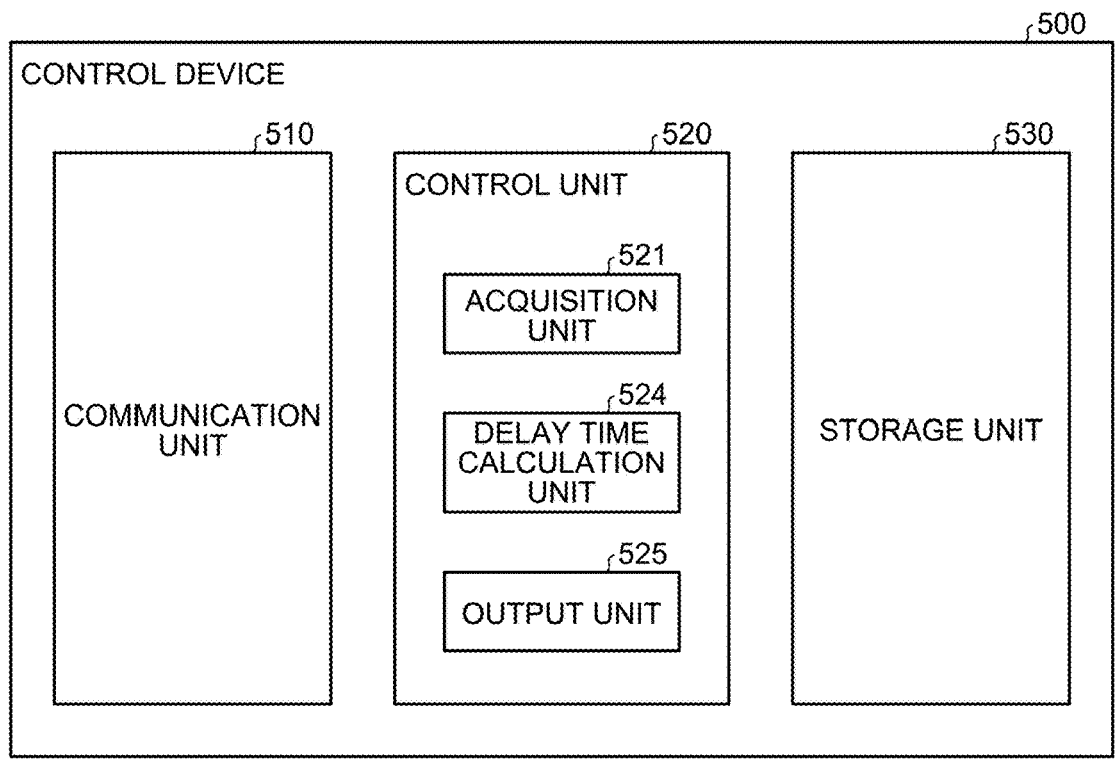
FIG. 9 is a diagram illustrating a configuration example of a control device according to a second embodiment.

In the second embodiment, the functional configurations of the data processing device 400 and the control device 500 are different from those of the first embodiment. FIG. 8 is a diagram illustrating a configuration example of a data processing device 400 according to the second embodiment. FIG. 9 is a diagram illustrating a configuration example of a control device 500 according to the second embodiment.

As illustrated in FIG. 8, the control unit 420 of the data processing device 400 includes a timing control unit 421 and a data processing unit 422. Furthermore, as illustrated in FIG. 9, the control unit 520 of the control device 500 includes an acquisition unit 521, a delay time calculation unit 524, and an output unit 525.

Next, an operation example of the communication system S according to the second embodiment will be described.

First, the acquisition unit 521 of the control device 500 acquires information related to communication from the wireless communication device 100. Specifically, the acquisition unit 521 acquires, from the first wireless communication device 100A, information related to the first communication including identification information for identifying an application (service) corresponding to the first wireless communication service and a measurement result of RTT (which may be referred to as RTT1) indicating the first delay time. In addition, the acquisition unit 521 acquires, from the second wireless communication device 100B, information related to the second communication including identification information for identifying an application (service) corresponding to the second wireless communication service and a measurement result of the RTT indicating the second delay time (also referred to as RTT2 in some cases). Note that the identification information is, for example, a process ID (alternatively, a task ID or a session ID) of a multiplay game being processed by the data processing device 400.

Subsequently, the delay time calculation unit 524 of the control device 500 calculates a difference in delay caused by a difference (a difference in the position of the wireless communication device 100, a difference in the network configuration, and the like.) between the first wireless communication service and the second wireless communication service on the basis of the information related to the first communication and the information related to the second communication. That is, in a case where the difference in delay is Df, the difference is calculated by Df=|RTT1−RTT2|/2.

Subsequently, in a case where the identification information for identifying the application (service) is the same, the output unit 525 of the control device 500 provides information based on the calculation result of the delay time calculation unit 524 to the timing control unit 421 of the data processing device 400. Note that the information based on the calculation result of the delay time calculation unit 524 includes information regarding a difference in delay caused by a difference between the first wireless communication service and the second wireless communication service (for example, Df), a magnitude relationship of the delay, and the like.

The data processing unit 422 of the data processing device 400 processes the first data to be transmitted to the first wireless communication device 100A or the second data to be transmitted to the second wireless communication device 100B via the communication unit 410.

Here, for example, in a case where the magnitude relationship is RTT1>RTT2, the timing control unit 421 performs control to delay the transmission timing of the second data to be transmitted to the second wireless communication device 100B by |RTT1−RTT2|/2. That is, the timing control unit 421 delays the transmission timing to the second wireless communication device 100B to match the delay time of the first wireless communication device 100A having a long delay time. On the other hand, in a case where RTT1<RTT2, the timing control unit 421 performs control to delay the transmission timing of the first data to be transmitted to the first wireless communication device 100A by |RTT1−RTT2|/2. That is, the timing control unit 421 delays the transmission timing to the first wireless communication device 100A to match the delay time of the second wireless communication device 100B having a long delay time.

As a result, in a case where a plurality of users use the same multiplay service via wireless communication services of different communication carriers, it is possible to ensure uniform QoE with respect to delay of data transmission/reception. That is, for example, when a service is provided to a plurality of users who are relatively distant from each other (who do not exist in an adjacent area), it is possible to suppress a difference in communication quality regarding a delay caused by a difference in network configuration, position, or the like.

In addition, the data processing unit 422 of the data processing device 400 may transmit the same third data to the first base station device 200A and the second base station device 200B by a broadcasting method via the communication unit 410, and the timing control unit 421 may notify the first base station device 200A or the second base station device 200B of the above-described Df (=|RTT1−RTT2|/2).

For example, in a case where the magnitude relationship is RTT1>RTT2, the timing control unit 421 notifies the second base station device 200B of Df, and the second base station device 200B delays the third data received from the data processing unit 422 by Df and transmits the third data to the second wireless communication device 100B. The first base station device 200A transmits the third data received from the data processing unit 422 to the first wireless communication device 100A as it is.

On the other hand, for example, in a case where the magnitude relationship is RTT1<RTT2, the timing control unit 421 notifies the first base station device 200A of Df, and the first base station device 200A delays the third data received from the data processing unit 422 by Df and transmits the third data to the first wireless communication device 100A. The second base station device 200B transmits the third data received from the data processing unit 422 to the second wireless communication device 100B as it is.

Note that the second embodiment is suitable when the signal in the transmission direction including the uplink and the signal in the reception direction including the downlink between the wireless communication device 100 and the data processing device 400 have temporal symmetry.

Next, in the second embodiment, the temporal symmetry of transmission and reception is assumed, but in the following modification example of the second embodiment, it is preferable in a case where the transmission and reception symmetry regarding the delay is not necessarily ensured due to the asymmetry of the transmission and reception traffic.

First, the communication unit 410 of the data processing device 400 broadcasts the reference signal to the first wireless communication device 100A and the second wireless communication device 100B at a fixed or variable cycle. Then, the first wireless communication device 100A receives the reference signal transmitted from the data processing device 400 via the first core network 300A and the first base station device 200A. At this time, the measurement unit 121 of the first wireless communication device 100A measures the timing T1 at which the reference signal is received.

Similarly, the second wireless communication device 100B receives the reference signal transmitted from the data processing device 400 via the second core network 300B and the second base station device 200B. At this time, the measurement unit 121 of the second wireless communication device 100B measures the timing T2 at which the reference signal is received.

Then, the first wireless communication device 100A and the second wireless communication device 100B report information of the measured timings T1 and T2 to the control device 500 as information related to communication.

For example, the acquisition unit 521 of the control device 500 receives the measurement result (T1) related to the reception timing of the reference signal from the first wireless communication device 100A, and receives the measurement result (T2) related to the reception timing of the reference signal from the second wireless communication device 100B.

Then, the delay time calculation unit 524 calculates a difference in delay caused by a difference between the first wireless communication service and the second wireless communication service. That is, in a case where the difference in delay is Df, Df=|T1−T2| is calculated.

Then, the output unit 525 provides the timing control unit 421 of the data processing device 400 with information regarding a difference in delay caused by the difference between the first wireless communication service and the second wireless communication service calculated by the delay time calculation unit 524, for example, information regarding a magnitude relationship with |T1−T2|.

Then, for example, in a case where T1>T2, the timing control unit 421 performs control to delay the transmission timing of the second data to be transmitted to the second wireless communication device 100B by |T1−T2|. On the other hand, for example, in a case where T1<T2, the timing control unit 421 performs control to delay the transmission timing of the first data to be transmitted to the first wireless communication device 100A by |T1−T2|.

Furthermore, for example, in a case where the magnitude relationship is T1>T2, the timing control unit 421 notifies the second base station device 200B of Df, and the second base station device 200B transmits the third data received from the data processing unit 422 to the second wireless communication device 100B with a delay of Df. The first base station device 200A transmits the third data received from the data processing unit 422 to the first wireless communication device 100A as it is.

On the other hand, for example, in a case where the magnitude relationship is T1<T2, the timing control unit 421 notifies the first base station device 200A of Df, and the first base station device 200A transmits the third data received from the data processing unit 422 to the first wireless communication device 100A with a delay of Df. The second base station device 200B transmits the third data received from the data processing unit 422 to the second wireless communication device 100B as it is.

4. Third Embodiment

Next, a communication system S according to a third embodiment will be described. Specifically, the third embodiment is different from the first embodiment and the second embodiment in that, for example, in a case where a plurality of users participates in the same multiplay game, the data rate of data transmitted from the data processing device 400 to each wireless communication device 100 is changed on the basis of the data rate of each wireless communication device 100.

Note that the wireless communication device 100 of each of the plurality of users may be in a situation in which the wireless communication service is used by different PLMNs, or may be in a situation in which the wireless communication service is used by the same PLMN by the switching process described in the first embodiment.

Hereinafter, the third embodiment will be described focusing on differences from the first embodiment and the second embodiment. A configuration of the communication system S according to the third embodiment is the same as that of the communication system S according to the first embodiment illustrated in FIG. 1.

Figure 10:
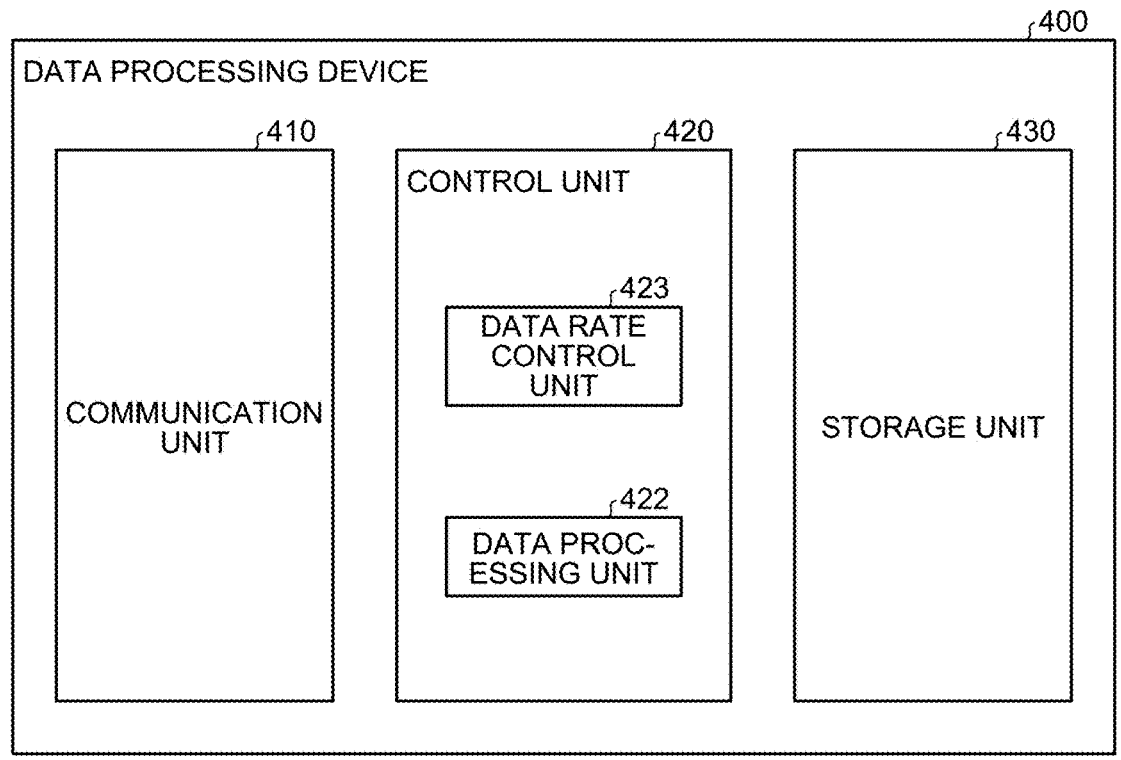
FIG. 10 is a diagram illustrating a configuration example of a data processing device according to a third embodiment.
Figure 11:
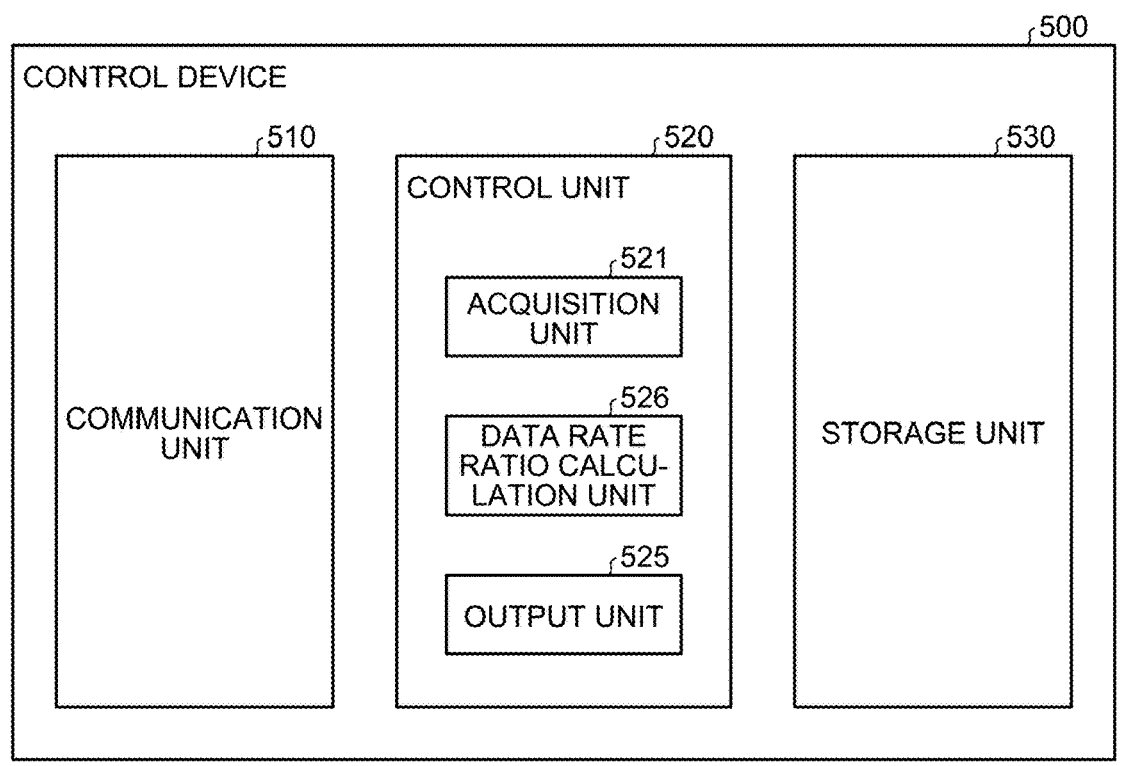
FIG. 11 is a diagram illustrating a configuration example of a control device according to a third embodiment.

In the third embodiment, functional configurations of a data processing device 400 and a control device 500 are different from those of the first embodiment and the second embodiment. FIG. 10 is a diagram illustrating a configuration example of a data processing device 400 according to the third embodiment. FIG. 11 is a diagram illustrating a configuration example of a control device 500 according to the third embodiment.

As illustrated in FIG. 10, the control unit 420 of the data processing device 400 includes a data rate control unit 423 and a data processing unit 422. Furthermore, as illustrated in FIG. 11, the control unit 520 of the control device 500 includes an acquisition unit 521, a data rate ratio calculation unit 526, and an output unit 525.

Next, an operation example of the communication system S according to the third embodiment will be described. The acquisition unit 521 of the control device 500 acquires information related to communication from the wireless communication device 100. Specifically, the acquisition unit 521 acquires, from the first wireless communication device 100A, information related to the first communication including identification information for identifying an application (service) corresponding to the first wireless communication service and a measurement result of the first data rate (which may be described as DR1). In addition, the acquisition unit 521 acquires, from the second wireless communication device 100B, information related to the second communication including identification information for identifying an application (service) corresponding to the second wireless communication service and a measurement result of the second data rate (which may be referred to as DR2). Note that the identification information is, for example, a process ID (alternatively, a task ID or a session ID) of a multiplay game being processed by the data processing device 400.

Subsequently, the data rate ratio calculation unit 526 of the control device 500 calculates a difference in data rates due to a difference (a difference in the position of the wireless communication device 100, a difference in the network configuration, and the like.) between the first wireless communication service and the second wireless communication service on the basis of the information related to the first communication and the information related to the second communication. That is, when the difference between the data rates is DRf, the difference is calculated by DRf=DR1/DR2 (or DR2/DR1).

Subsequently, in a case where the identification information for identifying the application (service) is the same, the output unit 525 of the control device 500 provides information based on the calculation result of the data rate ratio calculation unit 526 to the data rate control unit 423 of the data processing device 400. Note that the information based on the calculation result of the data rate ratio calculation unit 526 includes information regarding a difference in data rates caused by a difference between the first wireless communication service and the second wireless communication service (For example, DRf), a data rate magnitude relationship, and the like.

The data processing unit 422 of the data processing device 400 processes the first data to be transmitted to the first wireless communication device 100A or the second data to be transmitted to the second wireless communication device 100B via the communication unit 410.

Here, for example, when the magnitude relationship is DR1>DR2, the data rate control unit 423 changes the transmission parameter so that the transmission data rate of the first data to be transmitted to the first wireless communication device 100A becomes DR2. For example, the data rate control unit 423 controls the resource allocation rate of the scheduler to be DR2/DR1. That is, the data rate control unit 423 reduces the transmission data rate to the first wireless communication device 100A to match the data rate of the second wireless communication device 100B having a small data rate. On the other hand, for example, when the magnitude relationship is DR1<DR2, the data rate control unit 423 changes the transmission parameter so that the transmission data rate of the second data to be transmitted to the second wireless communication device 100B becomes DR1. For example, the data rate control unit 423 controls the resource allocation rate of the scheduler to be DR1/DR2. That is, the data rate control unit 423 reduces the transmission data rate to the second wireless communication device 100B to match the data rate of the first wireless communication device 100A having a small data rate.

In addition, the data processing unit 422 of the data processing device 400 may transmit the same third data to the first base station device 200A and the second base station device 200B by a broadcasting method via the communication unit 410, and the data rate control unit 423 may notify the above-described DRf (=DR1/DR2 (or DR2/DR1)) to the first base station device 200A or the second base station device 200B.

For example, in a case where the magnitude relationship is DR1<DR2, the data rate control unit 423 notifies the second base station device 200B of DRf, and the second base station device 200B controls the resource allocation rate of the scheduler to be DR1/DR2 and transmits the third data received from the data processing unit 422 to the second wireless communication device 100B. The first base station device 200A transmits the third data received from the data processing unit 422 to the first wireless communication device 100A as it is.

On the other hand, for example, in a case where the magnitude relationship is DR1>DR2, the data rate control unit 423 notifies the first base station device 200A of DRf, and the first base station device 200A controls the resource allocation rate of the scheduler to be DR2/DR1 and transmits the third data received from the data processing unit 422 to the first wireless communication device 100A. The second base station device 200B transmits the third data received from the data processing unit 422 to the second wireless communication device 100B as it is.

As a result, in a case where a plurality of users use the same multiplay service via wireless communication services of different communication carriers, it is possible to ensure uniform QoE regarding the data rate. That is, for example, when a service is provided to a plurality of users who are relatively distant from each other (who do not exist in an adjacent area), it is possible to suppress a difference in communication quality regarding a data rate caused by a difference in a network configuration, a position, or the like.

Note that, in the above description, an example in which the second embodiment and the third embodiment are individually mounted has been described; however, it goes without saying that a configuration in which the second embodiment and the third embodiment are simultaneously mounted is possible. That is, the data processing device 400 can constitute the control unit 420 having both the functions of the timing control unit 421 and the data rate control unit 423. In addition, the control device 500 can constitute a control unit 520 having the functions of the delay time calculation unit 524 and the data rate ratio calculation unit 526.

Furthermore, the control device 500 may control buffering in the buffers included in the first wireless communication device 100A and the second wireless communication device 100B and processing of the buffered data on the basis of the information regarding the delay and the information regarding the data rate acquired from the first wireless communication device 100A and the second wireless communication device 100B.

For example, in a case where a delay to the first wireless communication device 100A is X1, a delay to the second wireless communication device 100B is X2 (where X2>X1), a data rate to the first wireless communication device 100A is Y1, and a data rate to the second wireless communication device 100B is Y2, the control device 500 instructs the first wireless communication device 100A to perform control of buffering a buffer included in the first wireless communication device 100A for a period of "X2−X1" and starting processing of the buffered data after the period of "X2−X1" has elapsed. Furthermore, in a case where Y2>Y1, the control device 500 performs control to lower the resolution of image data and/or audio data included in data to be transmitted to the first wireless communication device 100A, as compared with the second wireless communication device 100B. On the other hand, in a case where Y1>Y2, the control device 500 performs control to increase the resolution of the image data and/or the audio data included in the data to be transmitted to the first wireless communication device 100A, as compared with the second wireless communication device 100B.

5. Modification Example

The PLMN switching instruction (for example, Step S107 in FIG. 7) described above may be transmitted to the first wireless communication device (or the second wireless communication device) as an application layer message. In this case, the PLMN switching indication (for example, Step S107 in FIG. 7) may be transmitted with the message of the application layer encapsulated in the header of the lower layer as the SDU of the lower layer. When the lower layer is the RRC layer, an RRC message (RRC PDU) encapsulating the PLMN switching indication may be an RRC release message. That is, the control device 500 may instruct the base station device to transmit the RRC release message via the core network. The base station device may transmit the RRC release message in response to reception of the transmission instruction. The RRC release message may include a Cause value, and the Cause value may indicate switching of the PLMN.

The base station device, the wireless communication device, the data processing device, or the control device of the present embodiment may be realized by a dedicated computer system or a general-purpose computer system.

For example, a communication program for executing the above-described operation (for example, PLMN switching processing or the like) is stored and distributed in a computer-readable recording medium such as an optical disk, a semiconductor memory, a magnetic tape, or a flexible disk. Then, for example, the program is installed in a computer, and the above-described processing is executed to configure the control device. At this time, the control device may be the wireless communication device 100, the base station device 200, the data processing device 400, the control device 500, or another external device (For example, a personal computer). Furthermore, the control device may be a device (for example, each control unit) inside the wireless communication device 100, the base station device 200, the data processing device 400, and the control device 500.

In addition, the communication program may be stored in a disk device included in a server device on a network such as the Internet so that the communication program can be downloaded to a computer. In addition, the above-described functions may be realized by cooperation of an operating system (OS) and application software. In this case, a portion other than the OS may be stored in a medium and distributed, or a portion other than the OS may be stored in a server device and downloaded to a computer.

Among the processes described in the above embodiments, all or a part of the processes described as being performed automatically can be performed manually, or all or a part of the processes described as being performed manually can be performed automatically by a known method. In addition, the processing procedure, specific name, and information including various data and parameters illustrated in the document and the drawings can be arbitrarily changed unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in a semi-static or dynamic arbitrary unit according to various loads, usage conditions, and the like.

In addition, the above-described embodiments can be appropriately combined in a region in which the processing contents do not contradict each other. In addition, the order of each step illustrated in the flowchart or the sequence diagram of each embodiment described above can be changed as appropriate.

6. CONCLUSION

As described above, according to an embodiment of the present disclosure, the control device 500 includes the control unit 520. The control unit 520 acquires information related to first communication including position information of the first wireless communication device 100A, information for identifying a process of the first application, and information for identifying the first PLMN from the first wireless communication device 100A that performs data communication of the first application via the first PLMN, acquires information related to second communication including position information of the second wireless communication device 100B, information for identifying a process of the second application, and information for identifying the second PLMN from the second wireless communication device 100B that performs data communication of the second application via the second PLMN, and determines execution of switching processing for switching the PLMN of one wireless communication device 100 to the PLMN of the other wireless communication device 100 on the basis of the information related to the first communication and the information related to the second communication. This makes it possible to suppress a difference in communication quality caused by a network configuration when providing a service to a plurality of users.

Although the embodiments of the present disclosure have been described above, the technical scope of the present disclosure is not limited to the above-described embodiments as it is, and various modifications can be made without departing from the gist of the present disclosure. In addition, components of different embodiments and modification examples may be appropriately combined.

Furthermore, the effects of each embodiment described in the present specification are merely examples and are not limited, and other effects may be provided.

Note that the present technique can also have the following configurations.

(1)

A control device comprising a control unit that:
acquires, from a first wireless communication device that performs data communication of a first application via a first PLMN, information related to first communication including position information of the first wireless communication device, information for identifying a process of the first application, and information for identifying the first PLMN;
acquires, from a second wireless communication device that performs data communication of a second application via a second PLMN, information related to second communication including position information of the second wireless communication device, information for identifying a process of the second application, and information for identifying the second PLMN; and
determines execution of switching processing of switching the PLMN of one of the wireless communication devices to the PLMN of the other of the wireless communication devices based on the information related to the first communication and the information related to the second communication.

(2)

The control device according to the above-described (1), wherein
for the first wireless communication device and the second wireless communication device, when the position information falls within an arbitrarily set range, the process of the first application and the process of the second application are identical, and the first PLMN and the second PLMN are different,
the control unit determines execution of the switching processing of switching the PLMN of one of the wireless communication devices to the PLMN of the other of the wireless communication devices.

(3)

The control device according to the above-described (1) to (2), wherein
the control unit acquires information related to a first delay time in the data communication of the first wireless communication device and information related to a second delay time in the data communication of the second wireless communication device, and
determines execution of the switching processing based on the information related to the first delay time and the information related to the second delay time.

(4)

The control device according to the above-described (3), wherein
the control unit determines execution of the switching processing of switching the first PLMN to the second PLMN when the second delay time is shorter than the first delay time, and
determines execution of the switching processing of switching the second PLMN to the first PLMN when the first delay time is shorter than the second delay time.

(5)

The control device according to the above-described (3) to (4), wherein the control unit controls a transmission timing of data to be transmitted to any one of the first wireless communication device and the second wireless communication device based on a difference between the first delay time and the second delay time.

(6)

The control device according to the above-described (5), wherein the control unit delays the transmission timing of the wireless communication device, the delay time of which is shorter, among the first wireless communication device and the second wireless communication device according to the difference.

(7)

The control device according to the above-described (1) to (6), wherein the control unit acquires information related to a first data rate in the data communication of the first wireless communication device and information related to a second data rate in the data communication of the second wireless communication device; and determines execution of the switching processing based on the information related to the first data rate and the information related to the second data rate.

(8)

The control device according to the above-described (7), wherein the control unit determines execution of the switching processing of switching the first PLMN to the second PLMN when the second data rate is greater than the first data rate; and determines execution of the switching processing of switching the second PLMN to the first PLMN when the first data rate is greater than the second data rate.

(9)

The control device according to the above-described (7) to (8), wherein the control unit controls a data rate of data to be transmitted to any one of the first wireless communication device and the second wireless communication device based on a difference or a ratio between the first data rate and the second data rate.

(10)

The control device according to the above-described (9), wherein the control unit limits a maximum data rate of the wireless communication device, the data rate of which is greater, among the first wireless communication device and the second wireless communication device.

(11)

The control device according to the above-described (10), wherein the control unit limits the maximum data rate to a data rate according to the difference or the ratio.

(12)

The control device according to the above-described (1) to (11), wherein the control unit instructs the first wireless communication device to execute the switching processing via a first base station device belonging to the first PLMN when determining execution of the switching processing of switching the first PLMN to the second PLMN, and instructs the second wireless communication device to execute the switching processing via a second base station device belonging to the second PLMN when determining execution of the switching processing of switching the second PLMN to the first PLMN.

(13)

A wireless communication device comprising a control unit that:

transmits, to a control device, position information of the wireless communication device that executes an application that performs data communication via a first PLMN;

receives an instruction of switching from the first PLMN to a second PLMN that is determined by using the position information, information for identifying a process of the application, and information for identifying the first PLMN by the control device; and executes switching processing from the first PLMN to the second PLMN according to the received instruction.

(14)

The wireless communication device according to the above-described (13), wherein when receiving the instruction of switching from the first PLMN to the second PLMN, the control unit sets one PLMN selected from a PLMN list included in information of an SIM stored in an SIM storage unit as the second PLMN.

(15)

The wireless communication device according to the above-described (13) to (14), wherein the control unit receives information about the second PLMN together with the instruction of switching from the first PLMN to the second PLMN, and switches from the first PLMN to the second PLMN based on the information.

(16)

A control method comprising:

acquiring, from a first wireless communication device that performs data communication of a first application via a first PLMN, information related to first communication including position information of the first wireless communication device, information for identifying a process of the first application, and information for identifying the first PLMN;

acquiring, from a second wireless communication device that performs data communication of a second application via a second PLMN, information related to second communication including position information of the second wireless communication device, information for identifying a process of the second application, and information for identifying the second PLMN; and determining execution of switching processing of switching the PLMN of one of the wireless communication devices to the PLMN of the other of the wireless communication devices based on the information related to the first communication and the information related to the second communication.

(17)

The control method according to the above-described (16), further comprising determining, for the first wireless communication device and the second wireless communication device, execution of the switching processing of switching the PLMN of one of the wireless communication devices to the PLMN of the other of the wireless communication devices when the position information falls within an arbitrarily set range, the process of the first application and the process of the second application are identical, and the first PLMN and the second PLMN are different.

(18)

The control method according to the above-described (16) to (17), further comprising:
  instructing the first wireless communication device to execute the switching processing via a first base station device belonging to the first PLMN when determining execution of the switching processing of switching the first PLMN to the second PLMN; and
  instructing the second wireless communication device to execute the switching processing via a second base station device belonging to the second PLMN when determining execution of the switching processing of switching the second PLMN to the first PLMN.

(19)

A control device including a control unit that:
  acquires, from a first wireless communication device that performs data communication of a first application via a first PLMN, information related to a first delay time in the data communication of the first wireless communication device;
  acquires, from a second wireless communication device that performs data communication of a second application via a second PLMN, information related to a second delay time in the data communication of the second wireless communication device; and
  controls a transmission timing of data to be transmitted to any one of the first wireless communication device and the second wireless communication device based on the information related to the first delay time and the information related to the second delay time.

(20)

A control device including a control unit that:
  acquires, from a first wireless communication device that performs data communication of a first application via a first PLMN, information related to a first data rate in the data communication of the first wireless communication device;
  acquires, from a second wireless communication device that performs data communication of a second application via a second PLMN, information related to a second data rate in the data communication of the second wireless communication device; and
  controls a data rate of data to be transmitted to any one of the first wireless communication device and the second wireless communication device based on the information related to the first data rate and the information related to the second data rate.

(21)

A control method including:
  acquiring, from a first wireless communication device that performs data communication of a first application via a first PLMN, information related to a first delay time in the data communication of the first wireless communication device;
  acquiring, from a second wireless communication device that performs data communication of a second application via a second PLMN, information related to a second delay time in the data communication of the second wireless communication device; and
  controlling a transmission timing of data to be transmitted to any one of the first wireless communication device and the second wireless communication device based on the information related to the first delay time and the information related to the second delay time.

(22)

A control method including:
  acquiring, from a first wireless communication device that performs data communication of a first application via a first PLMN, information related to a first data rate in the data communication of the first wireless communication device;
  acquiring, from a second wireless communication device that performs data communication of a second application via a second PLMN, information related to a second data rate in the data communication of the second wireless communication device; and
  controlling a data rate of data to be transmitted to any one of the first wireless communication device and the second wireless communication device based on the information related to the first data rate and the information related to the second data rate.

REFERENCE SIGNS LIST

100 WIRELESS COMMUNICATION DEVICE
110 WIRELESS COMMUNICATION UNIT
111 RECEPTION PROCESSING UNIT
111a WIRELESS RECEPTION UNIT
111b DEMULTIPLEXING UNIT
111c DEMODULATION UNIT
111d DECODING UNIT
112 TRANSMISSION PROCESSING UNIT
112a ENCODING UNIT
112b MODULATION UNIT
112c MULTIPLEXING UNIT
112d WIRELESS TRANSMISSION UNIT
113 ANTENNA
120 CONTROL UNIT
121 MEASUREMENT UNIT
122 SIM SWITCHING UNIT
130 STORAGE UNIT
140 NETWORK COMMUNICATION UNIT
150 INPUT/OUTPUT UNIT
160 SIM STORAGE UNIT
200 BASE STATION DEVICE
210 WIRELESS COMMUNICATION UNIT
211 RECEPTION PROCESSING UNIT
211a WIRELESS RECEPTION UNIT
211b DEMULTIPLEXING UNIT
211c DEMODULATION UNIT
211d DECODING UNIT
212 TRANSMISSION PROCESSING UNIT
212a ENCODING UNIT
212b MODULATION UNIT
212c MULTIPLEXING UNIT
212d WIRELESS TRANSMISSION UNIT
213 ANTENNA
220 CONTROL UNIT
230 STORAGE UNIT
300 CORE NETWORK
400 DATA PROCESSING DEVICE
410 COMMUNICATION UNIT
420 CONTROL UNIT
421 TIMING CONTROL UNIT
422 DATA PROCESSING UNIT
423 DATA RATE CONTROL UNIT
430 STORAGE UNIT
500 CONTROL DEVICE
510 COMMUNICATION UNIT
512 TRANSMISSION PROCESSING UNIT
520 CONTROL UNIT

521 ACQUISITION UNIT
522 SWITCHING DETERMINATION UNIT
523 SWITCHING DECISION UNIT
524 DELAY TIME CALCULATION UNIT
525 OUTPUT UNIT
526 DATA RATE RATIO CALCULATION UNIT
530 STORAGE UNIT
542 ACQUISITION UNIT
600 ROUTER

The invention claimed is:

1. A control device comprising a control unit that:
acquires, from a first wireless communication device that performs data communication of a first application via a first public land mobile network (PLMN), information related to first communication including position information of the first wireless communication device, information for identifying a process of the first application, and information for identifying the first PLMN;
acquires, from a second wireless communication device that performs data communication of a second application via a second PLMN, information related to second communication including position information of the second wireless communication device, information for identifying a process of the second application, and information for identifying the second PLMN; and
determines execution of switching processing of switching the PLMN of one of the wireless communication devices to the PLMN of the other of the wireless communication devices based on the information related to the first communication and the information related to the second communication.

2. The control device according to claim 1, wherein
for the first wireless communication device and the second wireless communication device, when the position information falls within an arbitrarily set range, the process of the first application and the process of the second application are identical, and the first PLMN and the second PLMN are different,
the control unit determines execution of the switching processing of switching the PLMN of one of the wireless communication devices to the PLMN of the other of the wireless communication devices.

3. The control device according to claim 1, wherein
the control unit acquires information related to a first delay time in the data communication of the first wireless communication device and information related to a second delay time in the data communication of the second wireless communication device, and
determines execution of the switching processing based on the information related to the first delay time and the information related to the second delay time.

4. The control device according to claim 3, wherein
the control unit determines execution of the switching processing of switching the first PLMN to the second PLMN when the second delay time is shorter than the first delay time, and
determines execution of the switching processing of switching the second PLMN to the first PLMN when the first delay time is shorter than the second delay time.

5. The control device according to claim 3, wherein
the control unit controls a transmission timing of data to be transmitted to any one of the first wireless communication device and the second wireless communication device based on a difference between the first delay time and the second delay time.

6. The control device according to claim 5, wherein
the control unit delays the transmission timing of the wireless communication device, the delay time of which is shorter, among the first wireless communication device and the second wireless communication device according to the difference.

7. The control device according to claim 1, wherein
the control unit acquires information related to a first data rate in the data communication of the first wireless communication device and information related to a second data rate in the data communication of the second wireless communication device; and
determines execution of the switching processing based on the information related to the first data rate and the information related to the second data rate.

8. The control device according to claim 7, wherein
the control unit determines execution of the switching processing of switching the first PLMN to the second PLMN when the second data rate is greater than the first data rate; and
determines execution of the switching processing of switching the second PLMN to the first PLMN when the first data rate is greater than the second data rate.

9. The control device according to claim 7, wherein
the control unit controls a data rate of data to be transmitted to any one of the first wireless communication device and the second wireless communication device based on a difference or a ratio between the first data rate and the second data rate.

10. The control device according to claim 9, wherein
the control unit limits a maximum data rate of the wireless communication device, the data rate of which is greater, among the first wireless communication device and the second wireless communication device.

11. The control device according to claim 10, wherein
the control unit limits the maximum data rate to a data rate according to the difference or the ratio.

12. The control device according to claim 1, wherein
the control unit instructs the first wireless communication device to execute the switching processing via a first base station device belonging to the first PLMN when determining execution of the switching processing of switching the first PLMN to the second PLMN, and
instructs the second wireless communication device to execute the switching processing via a second base station device belonging to the second PLMN when determining execution of the switching processing of switching the second PLMN to the first PLMN.

13. A wireless communication device comprising a control unit that:
transmits, to a control device, position information of the wireless communication device that executes an application that performs data communication via a first public land mobile network (PLMN);
receives an instruction of switching from the first PLMN to a second PLMN that is determined by using the position information, information for identifying a process of the application, and information for identifying the first PLMN by the control device; and
executes switching processing from the first PLMN to the second PLMN according to the received instruction.

14. The wireless communication device according to claim 13, wherein
when receiving the instruction of switching from the first PLMN to the second PLMN, the control unit sets one PLMN selected from a PLMN list included in information of an SIM stored in an SIM storage unit as the second PLMN.

15. The wireless communication device according to claim 13, wherein
the control unit receives information about the second PLMN together with the instruction of switching from the first PLMN to the second PLMN, and switches from the first PLMN to the second PLMN based on the information.

16. A control method performed by a control device of a wireless communication device, the control method comprising:
acquiring, from a first wireless communication device that performs data communication of a first application via a first public land mobile network (PLMN), information related to first communication including position information of the first wireless communication device, information for identifying a process of the first application, and information for identifying the first PLMN;
acquiring, from a second wireless communication device that performs data communication of a second application via a second PLMN, information related to second communication including position information of the second wireless communication device, information for identifying a process of the second application, and information for identifying the second PLMN; and
determining execution of switching processing of switching the PLMN of one of the wireless communication devices to the PLMN of the other of the wireless communication devices based on the information related to the first communication and the information related to the second communication.

17. The control method according to claim 16, further comprising determining, for the first wireless communication device and the second wireless communication device, execution of the switching processing of switching the PLMN of one of the wireless communication devices to the PLMN of the other of the wireless communication devices when the position information falls within an arbitrarily set range, the process of the first application and the process of the second application are identical, and the first PLMN and the second PLMN are different.

18. The control method according to claim 16, further comprising:
instructing the first wireless communication device to execute the switching processing via a first base station device belonging to the first PLMN when determining execution of the switching processing of switching the first PLMN to the second PLMN; and
instructing the second wireless communication device to execute the switching processing via a second base station device belonging to the second PLMN when determining execution of the switching processing of switching the second PLMN to the first PLMN.

* * * * *